(12) United States Patent
Feng

(10) Patent No.: US 10,212,139 B2
(45) Date of Patent: Feb. 19, 2019

(54) SYSTEMS AND METHODS FOR DATA ENCRYPTION AND DECRYPTION

(71) Applicant: Cypherputer Inc., Cupertino, CA (US)

(72) Inventor: Youlin Feng, Cupertino, CA (US)

(73) Assignee: CYPHERPUTER INC., Cupertino, CA (US)

( * ) Notice: Subject to any disclaimer, the term of this patent is extended or adjusted under 35 U.S.C. 154(b) by 0 days.

(21) Appl. No.: 15/996,446

(22) Filed: Jun. 2, 2018

(65) Prior Publication Data
US 2018/0295105 A1 Oct. 11, 2018

Related U.S. Application Data

(63) Continuation of application No. PCT/US2017/021831, filed on Mar. 10, 2017.

(60) Provisional application No. 62/307,208, filed on Mar. 11, 2016.

(51) Int. Cl.
| | |
|---|---|
| *H04L 29/06* | (2006.01) |
| *G06F 21/60* | (2013.01) |
| *G06F 21/78* | (2013.01) |
| *H04L 9/32* | (2006.01) |
| *H04W 4/80* | (2018.01) |
| *H04W 76/10* | (2018.01) |
| *G06F 21/32* | (2013.01) |

(52) U.S. Cl.
CPC ......... *H04L 63/0428* (2013.01); *G06F 21/32* (2013.01); *G06F 21/602* (2013.01); *G06F 21/606* (2013.01); *G06F 21/78* (2013.01); *H04L 9/3226* (2013.01); *H04L 63/10* (2013.01); *H04W 4/80* (2018.02); *H04W 76/10* (2018.02)

(58) Field of Classification Search
CPC ............................ H04L 63/0428; H04W 4/80
USPC ......................................................... 713/153
See application file for complete search history.

(56) References Cited

U.S. PATENT DOCUMENTS

| | | |
|---|---|---|
| 7,136,903 B1 | 11/2006 | Phillips et al. |
| 8,966,287 B2 | 2/2015 | Bogorad |
| 2004/0078568 A1 | 4/2004 | Pham et al. |
| 2009/0190760 A1 | 7/2009 | Bojinov et al. |
| 2011/0004555 A1 | 1/2011 | Onda et al. |
| 2012/0130874 A1 | 5/2012 | Mane et al. |
| 2013/0311789 A1 | 11/2013 | Johnson et al. |
| 2016/0062918 A1 | 3/2016 | Androulaki et al. |

FOREIGN PATENT DOCUMENTS

WO 2004064350 A2 7/2004

*Primary Examiner* — Anthony D Brown
(74) *Attorney, Agent, or Firm* — Weintraub Tobin; Zheng Andy Liu

(57) ABSTRACT

An example method includes, responsive to determining a device is connected to a second computing device, accessing a virtual storage area, the virtual storage area corresponds to storage space on the second computing device; responsive to detecting a first request by a user of the second computer device to read first data stored in the virtual storage area, transmitting the first data to the device; decrypting the first data to produce first decrypted data; transmitting the first decrypted data from the device to the second computing device; detecting a second request by a user of the second computer device to write second data to virtual storage area; responsive to detecting the second request, transmitting the second data to the device; encrypting the second data to produce second encrypted data; transmitting the second encrypted data from the device to the second computing device.

20 Claims, 32 Drawing Sheets

Figure 3   Connection with host computer 10

Host Computer /Gadget Software Module Block Diagram

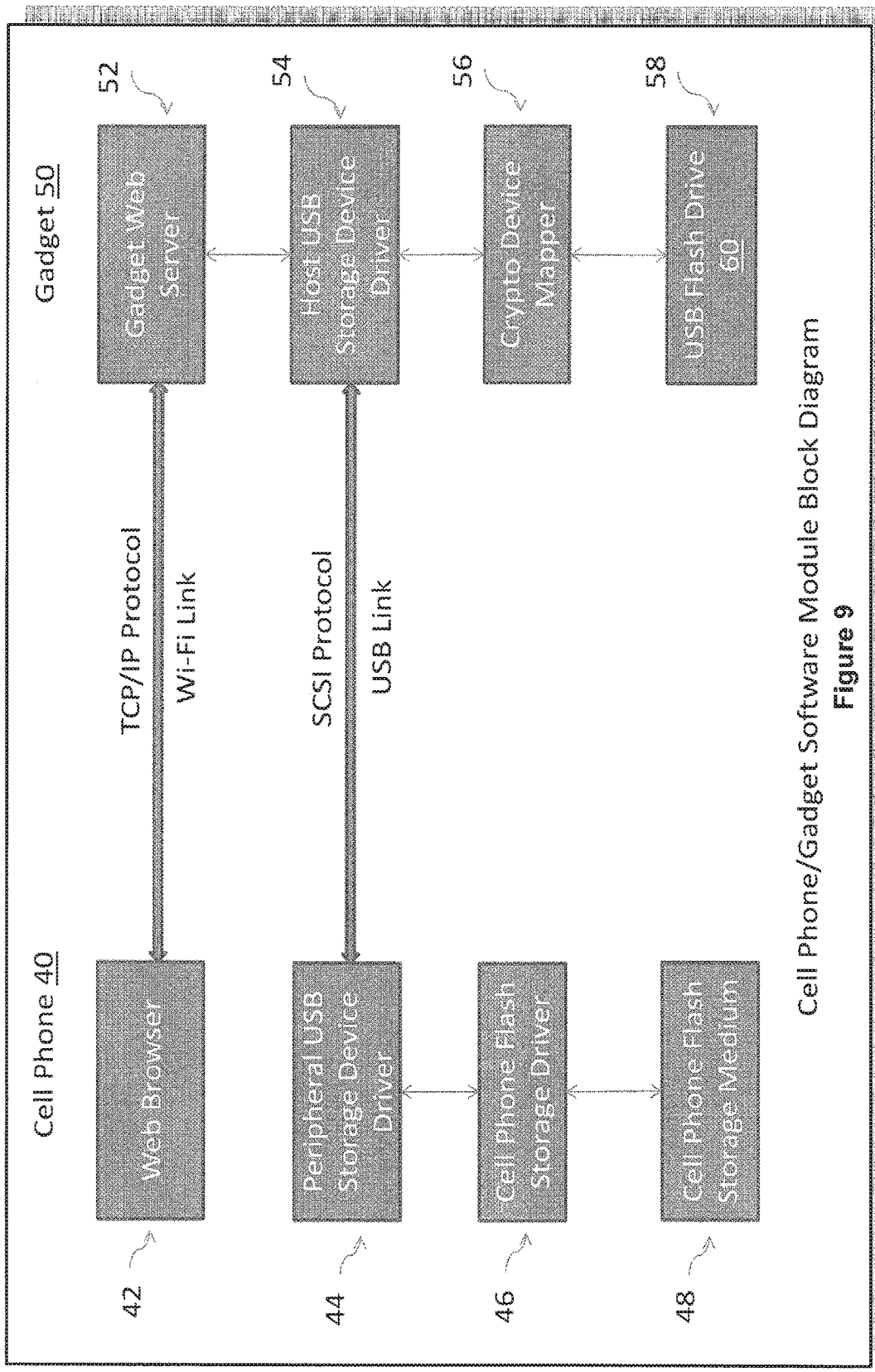

SYSTEMS AND METHODS FOR DATA ENCRYPTION AND DECRYPTION

RELATED APPLICATION

This application is a continuation of PCT Patent Application PCT/US2017/21831, filed Mar. 10, 2017, which claims the benefit of U.S. Provisional Patent Application Ser. No. 62/307,208, filed Mar. 11, 2016. Both of these patent applications are hereby incorporated by reference in their entireties.

TECHNICAL FIELD

The present disclosure generally relates to encryption and decryption devices.

BACKGROUND

The need for data security has increased over time. Especially when sensitive data are stored on a mobile device. For example, a user may store private pictures or chat logs on her smartphone. In another example, a business executive may store sensitive corporate emails on her laptop.

Difficulties abound for ensuring data security, however. Maintaining a software application on a mobile device to encrypt data on the mobile device may not be desirable for at least the following reasons. First, encryption and decryption software programs divert CPU time and other computing resources from other user applications. Second, due to their computationally costly nature, software encryption and decryption programs may not even be feasible for execution on certain mobile devices, e.g., smartphones or tablet computers, which are often equipped with less computing power compared to desktop computers or computing servers. The above identified technical problems are reduced or eliminated by the systems and methods disclosed in the present disclosure.

BRIEF DESCRIPTION OF THE DRAWINGS

FIGS. 8 and 9 are block diagrams illustrating example encryption and decryption systems.

Figure 1:
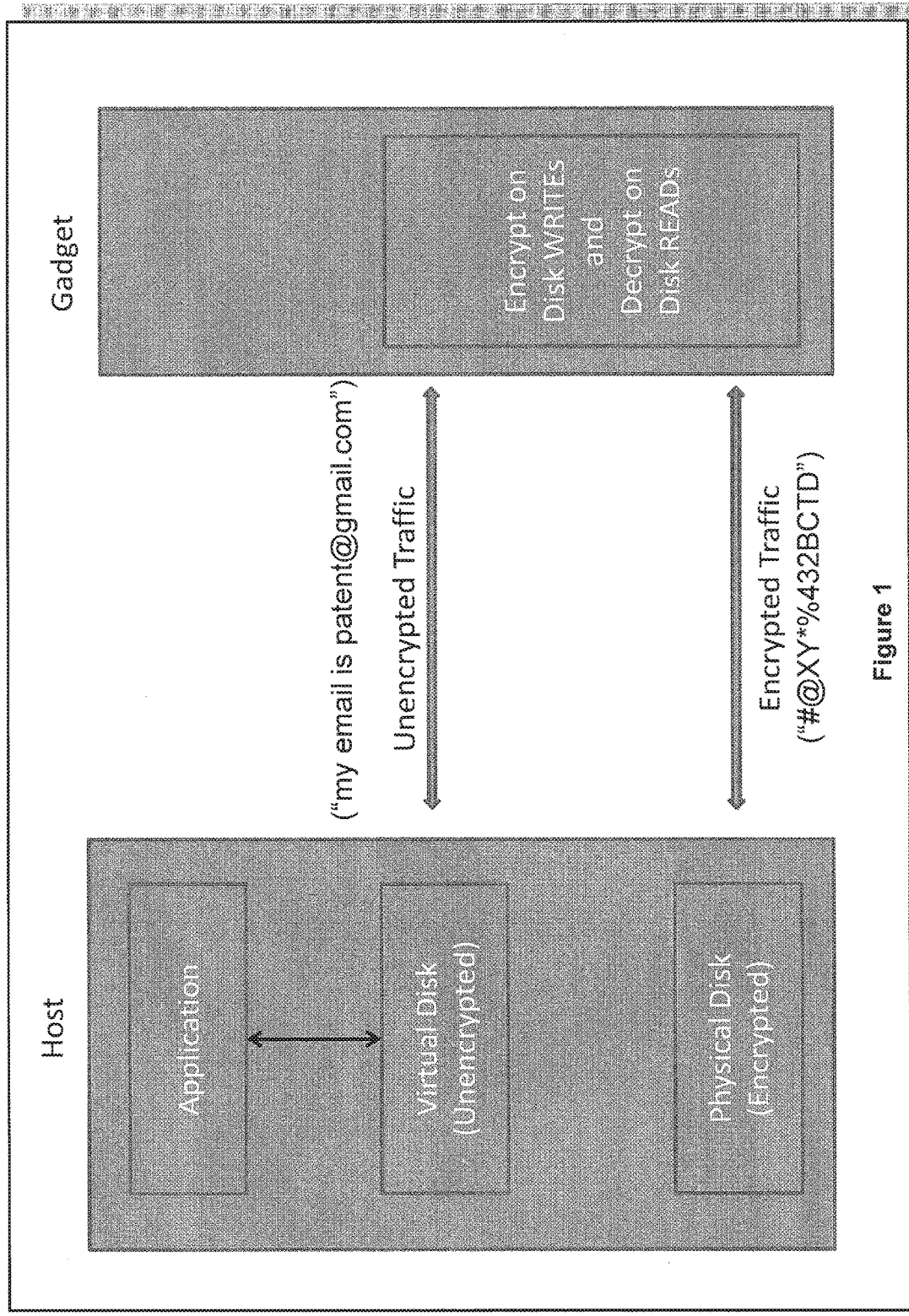
FIG. 1-3 are block diagrams illustrating example encryption and decryption systems and devices.

Embodiments of the present disclosure and their advantages are best understood by referring to the detailed description that follows. It should be appreciated that like reference numerals are used to identify like elements illustrated in one or more of the figures; showings therein are for purposes of illustrating embodiments of the present disclosure and not for purposes of limiting the same.

DETAILED DESCRIPTION

The present disclosure provides systems and methods for data encryption and decryption that is independent from a host computer. The technologies described in the present disclosure can provide the following technical advantages. First, a host computer does not need to divert significant computing resources to data encryption and decryption activities. Second, data encryption and decryption activities are less restricted by a host computer, e.g., without requiring permission to install heavy weight encryption and decryption software on the host computer. Third, user data is stored, albeit in an encrypted format, on a host computer, which is often equipped with more storage space, compared to that of a gadget. Fourth, data security is enhanced, as even super users (e.g., system administrators) of a host computer may not be able to access data stored on the host computer. Fifth, data encryption and encryption can be transparent to a user accessing the data, reducing user efforts needed to manage and control data security. Additional details of implementations are now described in relation to the Figures.

FIG. 1 is a block diagram illustrating an example encryption and decryption system in accordance with some implementations. In some implementations, a mobile computing device (also referred to as a gadget in the present disclosure) with its own dedicated CPU and memory storage can connect, through a wired or wireless connection, to a host computer (e.g., a laptop computer). When a user would like to write data to the host computer, the data is transmitted to and encrypted by the gadget; the gadget then transmits the encrypted data back to the host computer for storage. When a user would like read data previously encrypted by the gadget and stored on the host computer, the encrypted data is transmitted to and decrypted by the gadget; the gadget then transmits the decrypted data back to the host computer for user access. In some implementations, a gadget includes a smartphone equipped with appropriate processing power and memory. In some implementations, a host computer (also referred to as a host in the present disclosure) includes a desktop computer, a laptop computer, a smartphone, or a tablet computer. In some implementations, the connection between a gadget and a host is a wireless connection, e.g., a wireless USB connection, a WIFI connection, a Bluebooth connection, and an NFC connection. In other implementations, the connection between a gadget and a host is a wired connection, e.g., a USB connection, a serial cable connection, a parallel cable connection, an HDMI connection, an Ethernet cable connection, a data cable connection, and a power cable connection.

Figure 2:
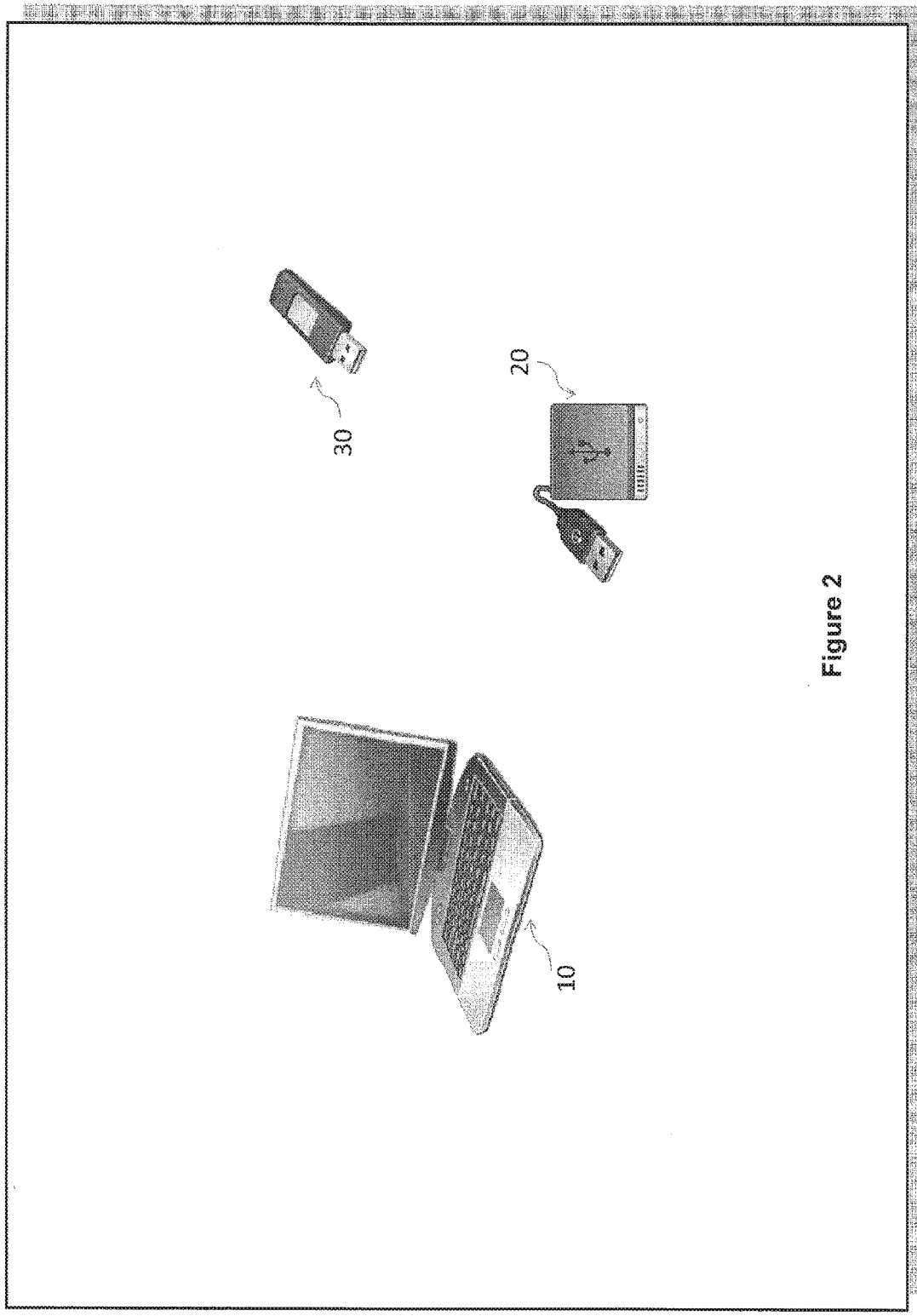

FIG. 2 is a block diagram illustrating an example encryption and decryption system in accordance with some implementations. As shown in FIG. 2, a host 10 can be a desktop or a notebook computer. A gadget (e.g., a data encryption and decryption device) can be a USB device 20 or 30 capable of connecting to the host through a USB connection.

A gadget 20 or 30 (e.g., a USB device with or without own dedicated CPU) can include non-transitory storage medium for storing encryption and decryption software programs. Software programs running on the gadget can (1) allow a user to designate storage space on either the host 10 or the gadget 20 or 30 for storing encrypted user data and (2) authenticate user access to a designated storage space.

Figure 3:
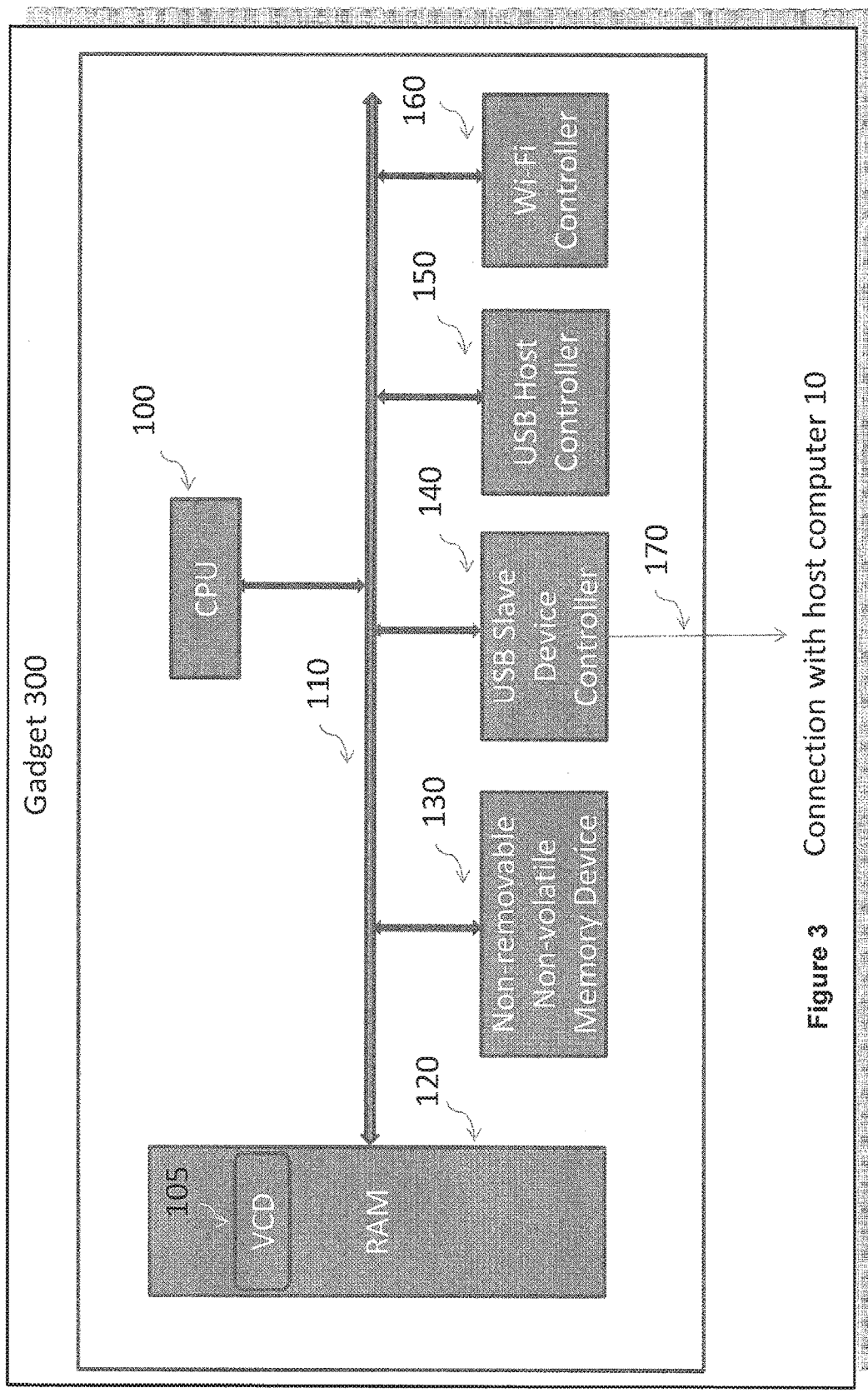

FIG. 3 is a block diagram illustrating an example encryption and decryption device 300. The device 300 in some implementations includes one or more processing units CPU(s) 100 (also referred to as processors), one or more network interfaces, a user interface, a memory 120, and one or more communication buses 110 for interconnecting these components. The communication buses 110 optionally include circuitry (sometimes called a chipset) that interconnects and controls communications between system components. The memory 120 typically includes high-speed random access memory, such as DRAM, SRAM, DDR RAM or other random access solid state memory devices; and optionally includes non-volatile memory 130, such as one or more magnetic disk storage devices, optical disk storage devices, flash memory devices, or other non-volatile solid state storage devices. The memory 120 optionally includes one or more storage devices remotely located from the CPU(s) 100. The memory 120, or alternatively the non-volatile memory device(s) within the memory 120, comprises a non-transitory computer readable storage medium. In some implementations, the memory 120 or alternatively the non-transitory computer readable storage medium stores the following programs, modules and data structures, or a subset thereof:

- an operating system (e.g., an embedded Linux operating system), which includes procedures for handling various basic system services and for performing hardware dependent tasks;
- a Virtual CD (VCD) module 105 for emulating a disk drive on a host computer;
- a network communication module (or instructions) for connecting the device 300 with other devices (e.g., a host) via one or more network interfaces (wired or wireless);
- a user interface module for displaying user interface components or controls (e.g., textbox, button, radio button, drop-down list) to a user;
- a USB slave device controller 170 for controlling various functionalities (e.g., data storage and access) of the device 300, e.g., when the device 300 is connected with a host device;
- a USB host controller 150 for accessing data stored on an external USB device (e.g., a device different form the device 300); and
- a WIFI controller 160 (also referred to as a WIFI direct controller in the present disclosure) for enabling two devices (e.g., the device 300 and the host 10 show in FIG. 1) to establish a direct and peer-to-peer WIFI connection without requiring a wireless router.

The operating system of the device 300 can be programed to, upon detecting a connection 170 to a host computer, present the device 300 to the host computer as a USB multifunction composite gadget device that provides Ethernet and mass storage interfaces. For example, the VCD module 105 may include an "usbnet" driver and a MICROSOFT Remote Network Driver Interface Specification (RNDIS) driver for connecting with a host running a LINUX operating system and with a WINDOWS operating system, respectively. In some implementations, the device 300's mass storage interface can implement the USB Mass Storage class, causing a host computer to recognize the device as a virtual SCSI disk drive.

Figure 4:
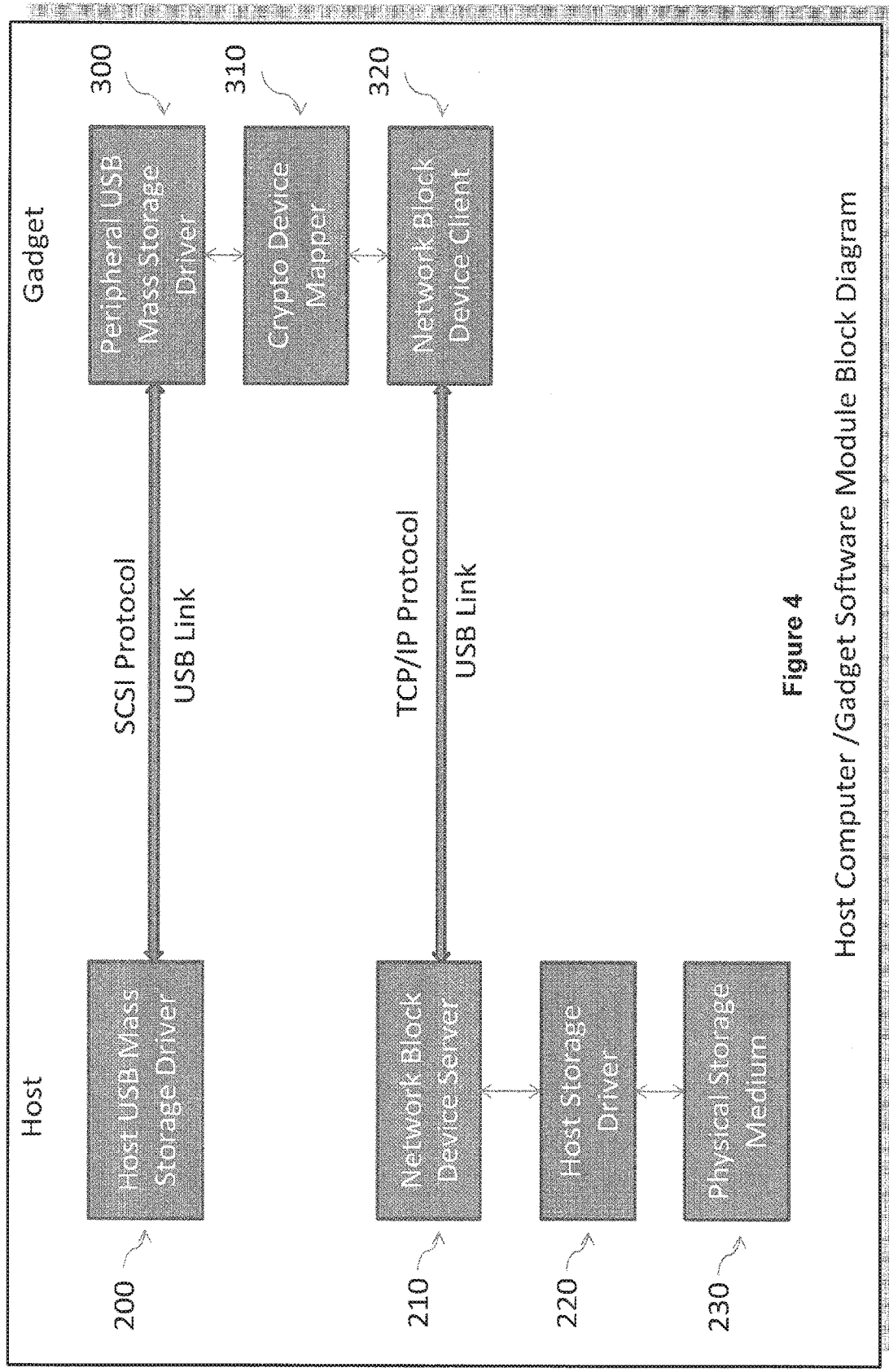
FIG. 4 is block diagram illustrating example modules of an encryption and decryption device and of a host computer.

FIG. 4 is block diagram illustrating various modules of an encryption and decryption device and of a host computer. A host computer in some implementations includes one or more processing units CPU(s) (also referred to as processors), one or more network interfaces, a user interface, a memory, and one or more communication buses for interconnecting these components. The communication buses optionally include circuitry (sometimes called a chipset) that interconnects and controls communications between system components. The memory typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory optionally includes one or more storage devices remotely located from the CPU(s). The memory, or alternatively the non-volatile memory device(s) within the memory, comprises a non-transitory computer readable storage medium. In some implementations, the memory or alternatively the non-transitory computer readable storage medium stores the following programs, modules and data structures, or a subset thereof:

- an operating system (e.g., a MICROSOFT WINDOWS operating system), which includes procedures for handling various basic system services and for performing hardware dependent tasks;
- a host USB mass storage driver 200 for enabling the host computer to access a USB storage device or an emulation thereof (e.g., an SCSI disk drive emulated by a gadget);
- a host network block device (NBD) server 210 for enabling a gadget to access storage space on a host via a TCP/IP connection; and
- a user interface module for presenting information to a user (e.g., a popup prompting the user to store files on a particular disk drive).

In addition to or in place of those described with reference to FIG. 3, the memory or alternatively the non-transitory computer readable storage medium of a gadget may also store the following programs, modules and data structures, or a subset thereof:

- a peripheral USB mass storage driver 300 for performing USB protocol operations, providing slave-side USB storage device functionality, and communicating with the host USB mass storage driver 200 (running on a host computer) using the SCSI protocol through a USB connection;
- a crypto device mapper 310 (e.g., a LINUX kernel driver) for encrypting/decrypting data received from a host computer; and
- a network block device (NBD) client 320 (e.g., a LINUX kernel module) for forwarding gadget requests (e.g., using TCP/IP) to the NBD server 210 to transfer data between a gadget and a host computer.

One or more of the above identified elements may be stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory optionally stores a subset of the modules and data structures identified above. Furthermore, the memory may store additional modules and data structures not described above.

These technologies enable a host computer to access its local storage devices as if they are USB drives provided by the gadget. For example, a user can create a partition "E" on her desktop computer's hard disk drive and use the partition E to store encrypted files.

Upon connection to a host computer, a gadget may create a virtual USB drive on the host computer, e.g., drive F, which serves as a cryptographic conduit for partition E. When a user writes data to the cryptographic volume, the write operation is performed against drive F and the write data are encrypted on the gadget before the encrypted data are written to partition E. When a user read data from the cryptographic volume, the read operation is performed against drive F and the data are read from the partition E, decrypted by the gadget, and provided to the host computer.

When a user accesses the partition E directly, the user might be informed that the partition E is not yet formatted and thus cannot be accessed (e.g., read from or write to)—although the partition E has indeed been formatted, albeit with file system information encrypted. From a user's perspective, the virtual USB drive F is the unencrypted version of the partition E and should be the target storage partition for file operations.

Although FIGS. 3 and 4 show a "gadget" and a "host," respectively, FIGS. 3 and 4 are intended more as functional description of the various features which may be present in computer systems than as a structural schematic of the implementations described herein. In practice, and as recognized by those of ordinary skill in the art, items shown separately could be combined and some items could be separated.

Figure 5A:
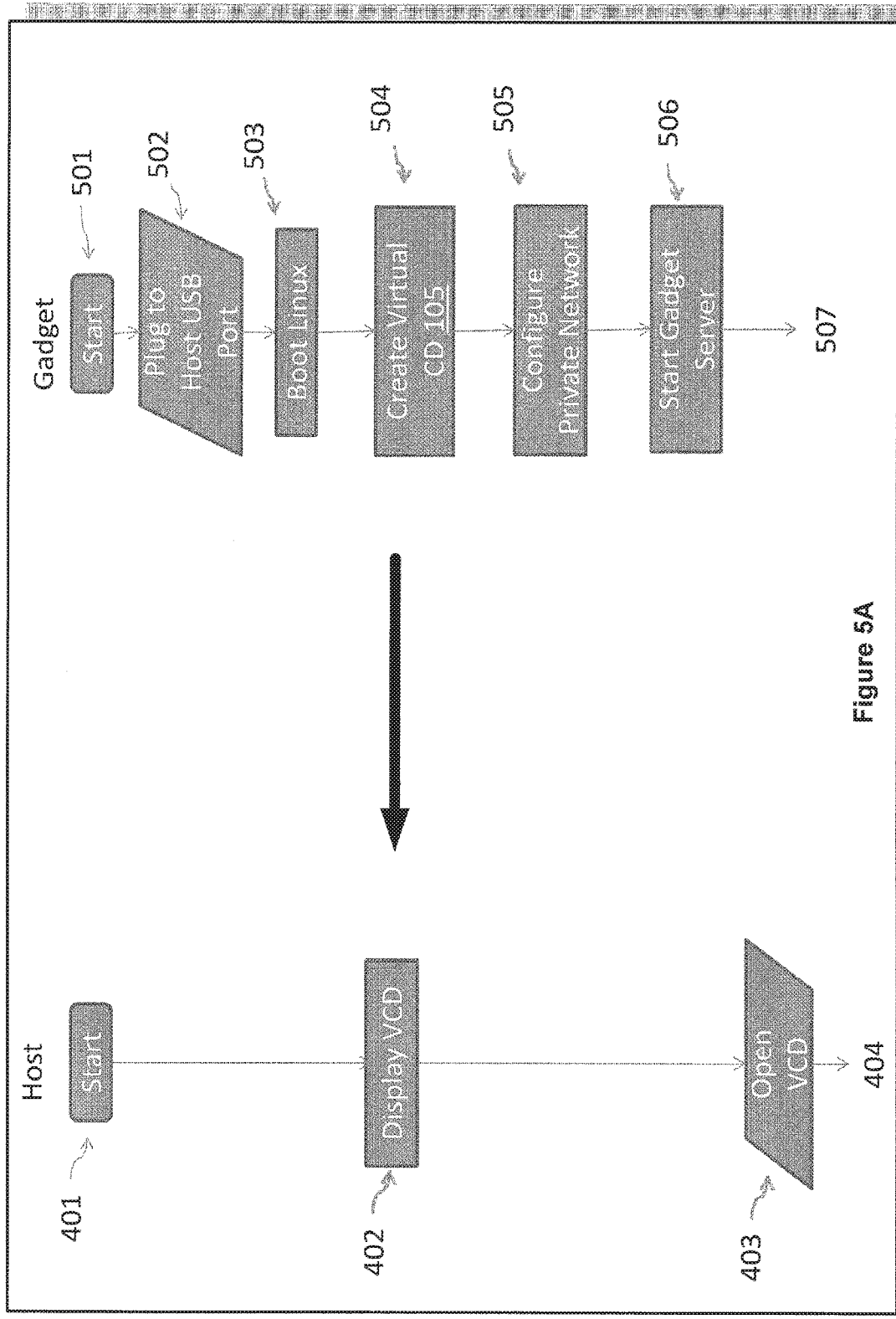
FIGS. 5A-5D and 6-7 are flowcharts illustrating example methods for data encryption and decryption.

FIGS. 5A-5D are flowcharts illustrating example methods for data encryption and decryption between a gadget and a host computer. In FIG. 5A, the host computer is powered on (401) and the gadget, when using a power source other than the host computer, can be separately powered on (501).

The gadget may plug (502) into a USB port of the host computer. The gadget may connect to the host computer in other manners, e.g., through a WIFI connection. After being powered on, the gadget can load the LINUX OS from its non-transitory memory storage medium device 130 and execute system initialization scripts to create (504) a virtual drive (e.g., a virtual CD drive). The virtual drive can store software applications and configuration programs for the host computer 10.

The gadget can instantiate the virtual CD drive using a portion of the memory of the gadget (e.g., the RAM 120 shown in FIG. 2) and causing the virtual CD drive to appear to the host as a CD drive. As part of the instantiation, the gadget can copy one or more files to the virtual CD drive, for example, the host client program and the host usbnet network interface configuration program. The gadget may create the virtual CD drive using a system initialization script including the one or more of the following programming instructions:

```
# dd if=/dev/zero of=/root/vcd_file bs=1M count=64
# mkdosfs /root/vcd_file
# mount -o loop /root/vcd_file /mnt
# cp <non-volatile-memory>/host_client.exe /mnt
# cp <non-volatile-memory>/config_host_usbnet.exe /mnt
# umount /mnt
# modprobe g_multi file=/root/vcd_file
```

The "modprobe" command can load the LINUX kernel g_multi module and instantiate the USB Multifunction Composite Gadget with one of its mass storage devices being the virtual CD drive. The virtual CD drive is backed up in the "vcd_file" file, which is stored in the gadget's RAM.

As part of the initialization, the gadget may, automatically without user intervention, cause a client program to be executed on the host computer (which is also referred to as a host client program in the present disclosure). For example, the gadget can execute a host client program (e.g., a "host_client.exe" file) and a network interface configuration program (e.g., a "config_host_usbnet.exe" file) to assign the host usbnet network interface a static IP address within the same (e.g., private) network as that of the gadget usbnet network interface. In other implementations, a user can manually execute the host client program. Similarly, the gadget can execute and maintain a server program (which is also referred to as a gadget server program in the present disclosure) to interact with the host client program through a TCP connection in a private IP network.

The host client program may request a user to (1) select a portion of the host computer storage for conversion into a cryptographic storage volume and (2) provide a user passphrases (e.g., a password) for accessing encrypted data. The host client program may create a cryptographic storage volume using local or remote storage (or a portion thereof) accessible to a host computer, e.g., a physical disk drive, a logical partition, a volume, or cloud storage. For example, as shown in FIG. 1, a USB drive 30 connected to the host computer 10 can be converted into a cryptographic volume. In some implementations, two or more different host storage spaces can be configured to produce a single cryptographic volume; in other implementations, a host computer can include two or more different cryptographic volumes created from different host storage spaces.

The gadget server program can authenticate a user by verifying a user-provided passphrase against a previously accepted user passphrase. In some implementation, the user authentication is done, in addition to or in place of the passphrase comparison, through a biometric comparison, e.g., a fingerprint comparison, a user-gesture comparison, or a voice comparison.

Upon a successful authentication, the gadget can establish a data connection with the host computer by configuring (505) a private network between the gadget server program and the host client program. In some implementations, to establish a connection between the gadget and the host, the gadget configures (505) the local usbnet network interface with a static IP address, for example, using LINUX utility "ifconfig usb0<gadget_IP_addr>," where the gadget_IP_addr is within a private network previously agreed upon by the gadget server program and the host client program.

Once a connection between the gadget server program and the host client program is established, data stored on the virtual CD drive may be available for access by the host computer. The host computer can optionally present (402) a visual indication of the virtual CD drive being ready for access, e.g., displaying an icon representing the virtual CD drive. The host computer may include two or more cryptographic devices. In some implementations, each cryptographic device has a corresponding instance of the host client program; multiple instances of the host client may connect to a single gadget server simultaneously.

As explained above, although the physical connection between the gadget and the host can be through a USB port, the data connection between the gadget and the host can be an IP connection. Therefore, the connection between the gadget and the host is also referred to as an IP-over-USB link.

Using an IP-over-USB link, the host client may request (406) a TCP connection to the gadget server. The gadget server accepts (508) the TCP connection request. Upon detecting a successful TCP connection between the host and the gadget, the host client can optionally request (407) a user to provide a name (e.g., "drive F") for the storage device. The host client can create (408) a Network Block Device (NBD) server thread for accessing the designated storage device. An NBD server is a software program for sharing an image of a file system or a disk partition on a host with a remote LINUX system over a network.

These techniques can enable a gadget to access storage space (e.g., a directory, a logical partition, and a physical disk) of a host, as if the storage space is provided by the gadget. These techniques are also referred to as storage emulation in the present disclosure.

Once an NBD server thread is created, the host client program can send (409) the NBD server's TCP port number to the gadget server and await a response from the gadget server. The response can include the host storage device's cryptographic header information, which indicates whether the device has previously been converted to a cryptographic volume.

The gadget server receives (509) the host NBD server TCP port number and begins (510) the NBD client program, which sets up the data transfers between the gadget and the host storage space. Example programming instructions for creating an instance of an NBD client that connects to an NBD server using TCP port number 9000 of the host, with the local block device name /dev/nbd0 on the gadget, are as follows:

nbd-client <host_IP_address>9000/dev/nbd0.

Through the NBD server-client connection, the gadget server may retrieve (511) from the host storage space, information indicative of whether the host storage space is already encrypted. The gadget server, in some implementation, retrieves the first 2 sectors of the selected host storage space, which contains the LINUX Unified Key Setup (LUKS) header when the host storage space is already a cryptographic volume. LUKS specifies a platform-independent standard on-disk format for disk encryption. The LUKS header can indicate whether a storage space has been encrypted. The gadget server can send (512) the information indicative of whether the selected host storage space is already encrypted (e.g., the LUKS header) to the host client.

Based on whether the selected host space is already encrypted (410), the host client can take different actions. In some implementation, in response to determining that the selected host space is not encrypted, the host client can prompt (412) a user to encrypt the selected host storage space and to provide a passphrase for future user authentication for accessing the encrypted storage space. In some implementation, encrypting a storage space may result in data on the storage space being deleted.

Optionally, the host client can request a user to enable a passphrase reset feature, e.g., by providing an answer to a password reset question. The host client then transfers (414) the passphrase and optionally the passphrase reset information to the gadget server.

If the selected host storage space is not encrypted, upon receiving user-provided passphrase, the gadget server encrypts (516) the selected host storage space. The following example programming instructions can set up the LUKS device header on the NBD block device and encrypt the master-key with the default cryptographic options (e.g., a default encryption algorithm):

cryptsetup -y luksFormat /dev/nbd0.

The gadget server can prepare the encrypted host storage space for host access by associating (518) the encrypted space with the USB slave device interface, so that user access to the gadget (e.g., a USB drive) will be redirected at the encrypted space.

Associating an encrypted space with a USB slave device interface, in some implementations is done by adding device /dev/mapper/<crypted_container_name> to the list of USB mass storage devices of the Linux kernel USB g_multi module. In response to determining that the selected host space is encrypted, the host client may authenticate the user for accessing the selected host space. For example, the host client can request the user to provide a passphrase and request the gadget server to authenticate the user based on the passphrase. Upon a successful authentication (e.g., a passphrase match), the gadget server can provide (517) the encrypted storage space for user access. The following example programming instructions can authenticate a user and provide user access to an encrypted storage space:

/dev/mapper/<crypted_container_name>.

These instructions can further create a dm-crypt device mapped to the local NBD device /dev/nbd0 attached to the storage device of the host.

cryptsetup luksOpen /dev/nbd0<crypted_container_name>

The host client can display (415) a USB drive icon on the host computer to indicate that the encrypted storage space is ready for user access. A user of the host computer can perform various file operations on the virtual drive (e.g., the virtual USB drive), for example, disk formatting, file creation, edit, copy and remove. Data written to the virtual USB drive are encrypted and data read from the virtual USB drive are decrypted automatically.

Note that in contrast with using a software application running on the host to encrypt/decrypt data, these technologies use the gadget—a device that is not only separate from the host but has own dedicated computing resources—to encrypt/decrypt data. These techniques are advantageous for at least the following reasons. First, any cryptographic cyphers that are supported by the LINUX kernel can be used for the data encryption and decryption, including custom cryptographic libraries. Second, encryption and decryption operations can be handled computationally by the gadget, reducing the need for computing resource from the host.

When a user disconnects (417) a virtual drive, the gadget closes the virtual drive. For example, when a user "ejects" a virtual USB drive, the LINUX USB mass storage gadget driver on the gadget receives the "eject" command and closes (520) the host storage space to user access, e.g., using the following programming instructions:

cryptsetup luksClose <crypted_container_name>.

The gadget server can disconnect from and terminate the NBD server running on (418), e.g., using the follow programming instructions:

nbd-client -d /dev/nbd0.

Figure 6:
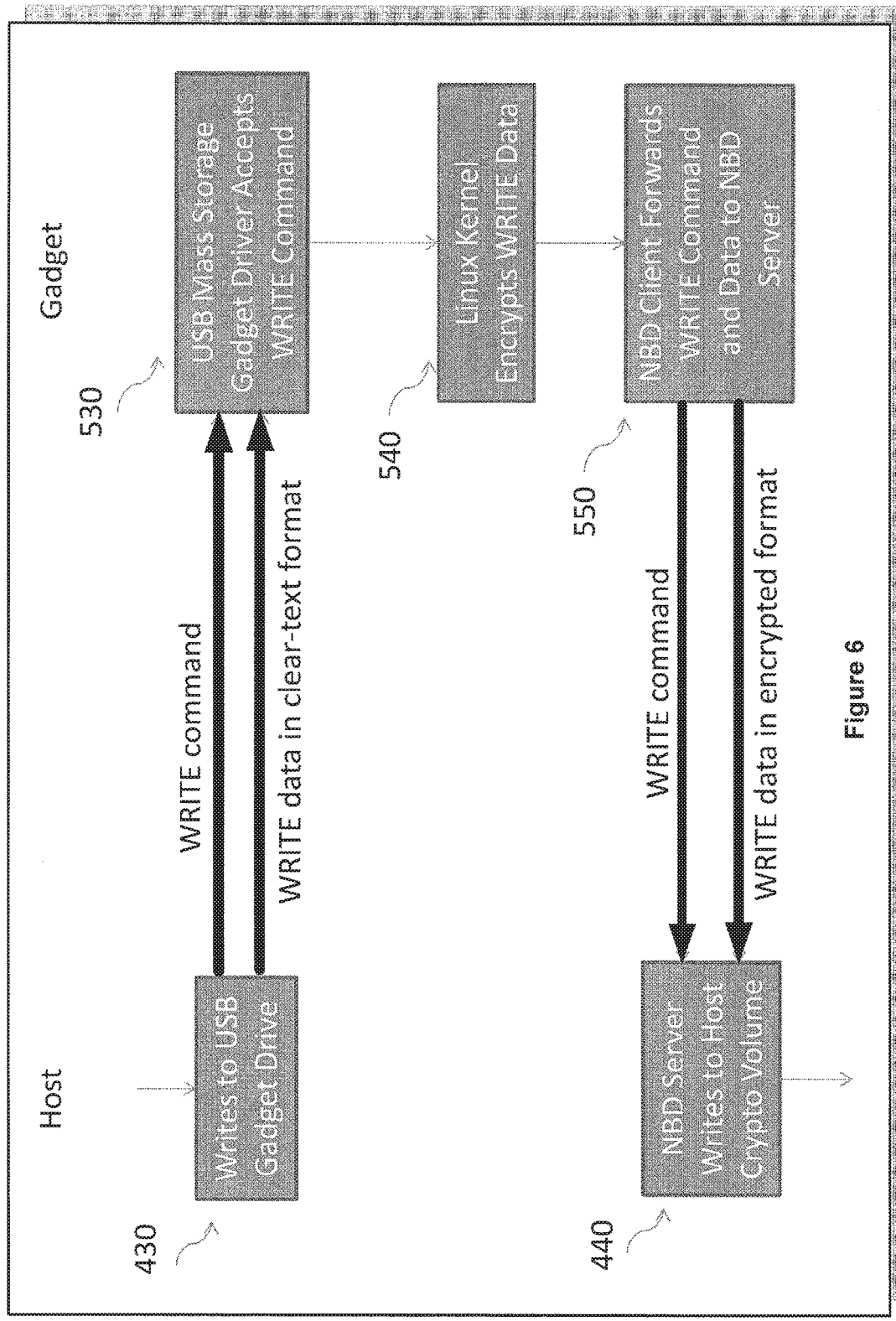

FIG. 6 is a flowchart illustrating an example method for encrypting data. When a host writes (430) (e.g., using a SCSI WRITE command) data to a virtual disk drive, the host transmits the clear-text (e.g., unencrypted) data to the gadget, e.g., through an IP-over-USB link.

The LINUX USB mass storage gadget driver running on the gadget can receive (530) the clear-text data. And the LINUX kernel crypto driver can encrypt (540) the clear-text data and passes the write command and the encrypted data to the Linux kernel NBD client thread. The NBD client thread forwards (550) the write command and the encrypted data to the NBD server running on the host computer, based on the host's IP address and the NBD server's TCP port number. After receiving the write command and the encrypted data from the gadget, the NBD server running on the host can write (440) the encrypted data onto the corresponding host storage space.

Figure 7:
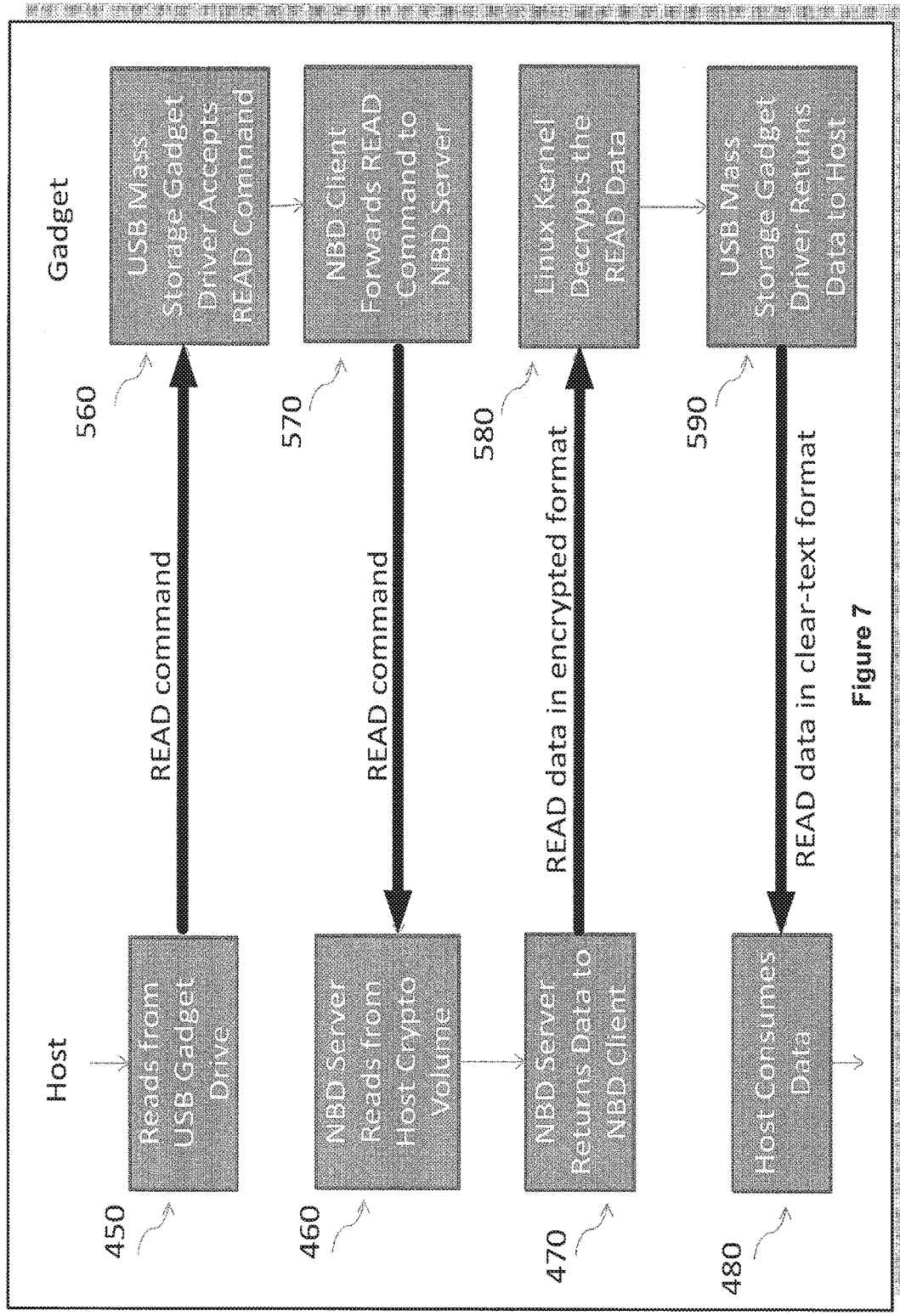

FIG. 7 is a flowchart illustrating an example method for decrypting data. When a host reads (450) (e.g., using a SCSI READ command) data from a virtual disk drive, the read request is forwarded to the LINUX USB mass storage gadget driver running on the gadget (560). The NBD client thread can further forward (570) the read command to the NBD server running on the host, based on the host's IP address and the NBD server's TCP port number. After reading the read command, the NBD server can read the specified data from the encrypted host storage space. The NBD server can then return (470) the data (as encrypted) to the NBD client running on the gadget. The kernel crypto driver running on the gadget can decrypt (580) the data and the Linux USB mass storage gadget driver can transfer (590) the data in a clear-text format back to the host, which can then provide the clear-text data to a corresponding user application.

Figure 8:
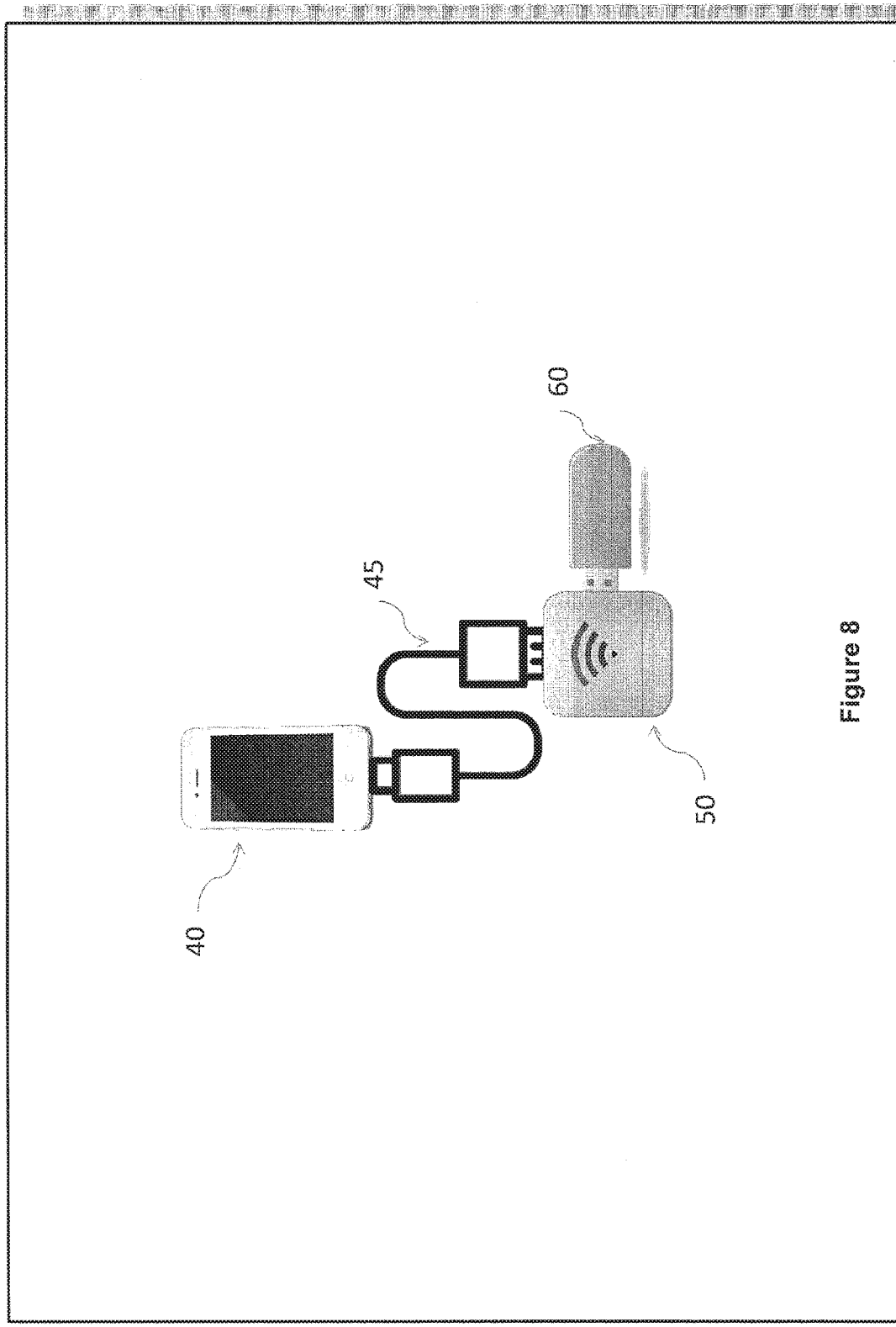

FIG. 8 is a block diagram illustrating an example encryption and decryption system. Similar encryption and decryption technologies discussed with reference to FIGS. 5A-5D and 6-7 can be applied to the system illustrated in FIG. 8. In some implementations, a gadget 50 is connected to a smartphone 40 via a USB cable 45; the gadget 50 is also connected to a removable USB flash drive 60. The smartphone 40 can be a host computer; the gadget 50 can encrypt files stored on the smartphone 40 and store the encrypted files on the USB flash drive 60. A user of the smartphone 40 can view or download the encrypted files stored on the USB flash drive 60 and decrypted by the gadget, in a clear-text format.

FIG. 9 is a block diagram illustrating an example encryption and decryption system. As shown in FIG. 9, a web browser 42 running on a smartphone 40 can provide a user interface for managing and accessing an encrypted storage space (e.g., file browsing). A web server 52 running on the gadget can handle user requests and initiate access to files stored on the smartphone and to the encrypted storage space.

In some implementations, the web browser 42 and the web server 52 are connected through a WIFI direct network using the TCP/IP. A WIFI direct network enables devices within the network to connect with each other without a wireless access point. The host USB storage driver 52 on the gadget provides access to the smartphone. The peripheral USB storage driver 44 running on the smartphone performs the USB protocol operations and provides the slave-side USB storage device functionality. The peripheral USB storage driver 44 can communicate with the gadget host USB storage driver 52 using the SCSI protocol over the USB connection. The LINUX crypto device mapper module 56 can encrypt and decrypt data written to and read from a USB flash drive 60 connected (e.g., through a USB port) with the gadget. In some alternative implementations, the USB flash drive 60 can be directly connected (e.g., through a data cable) with the smartphone 40. The smartphone flash storage driver 46 manages access to flash storage medium 48 equipped in the smartphone 40.

These technologies are advantageous in that a user would not need to install any application (or app) on the smartphone. This is significant, because it reduces or eliminates the need to request approval, e.g., from a smartphone manufacturer or an operating system running on the smartphone, for installing software applications on the smartphone.

Figure 10A:
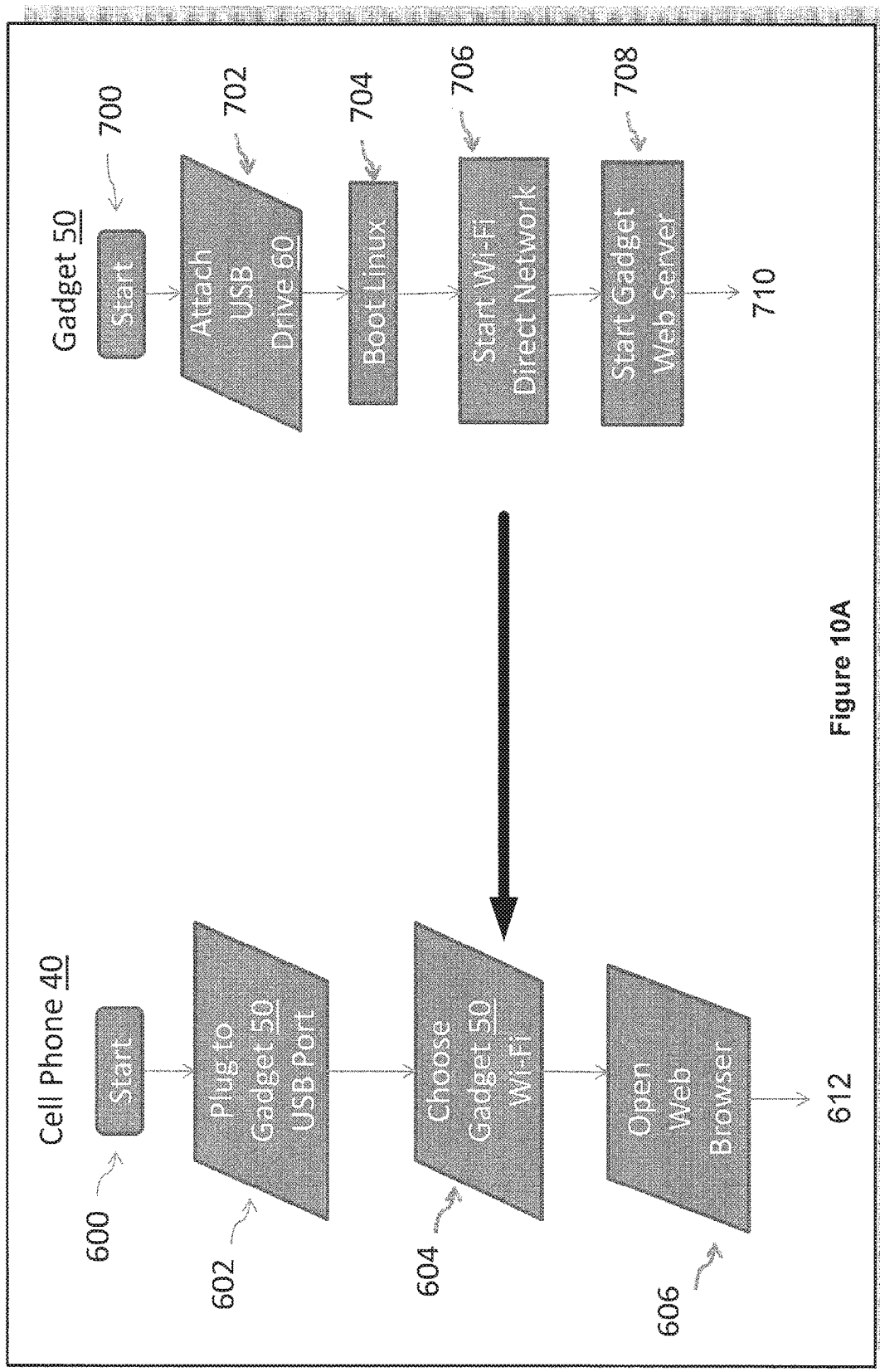
FIGS. 10A-10C are flowcharts illustrating example methods for encryption and decryption of data stored on a mobile device.
Figure 10B:
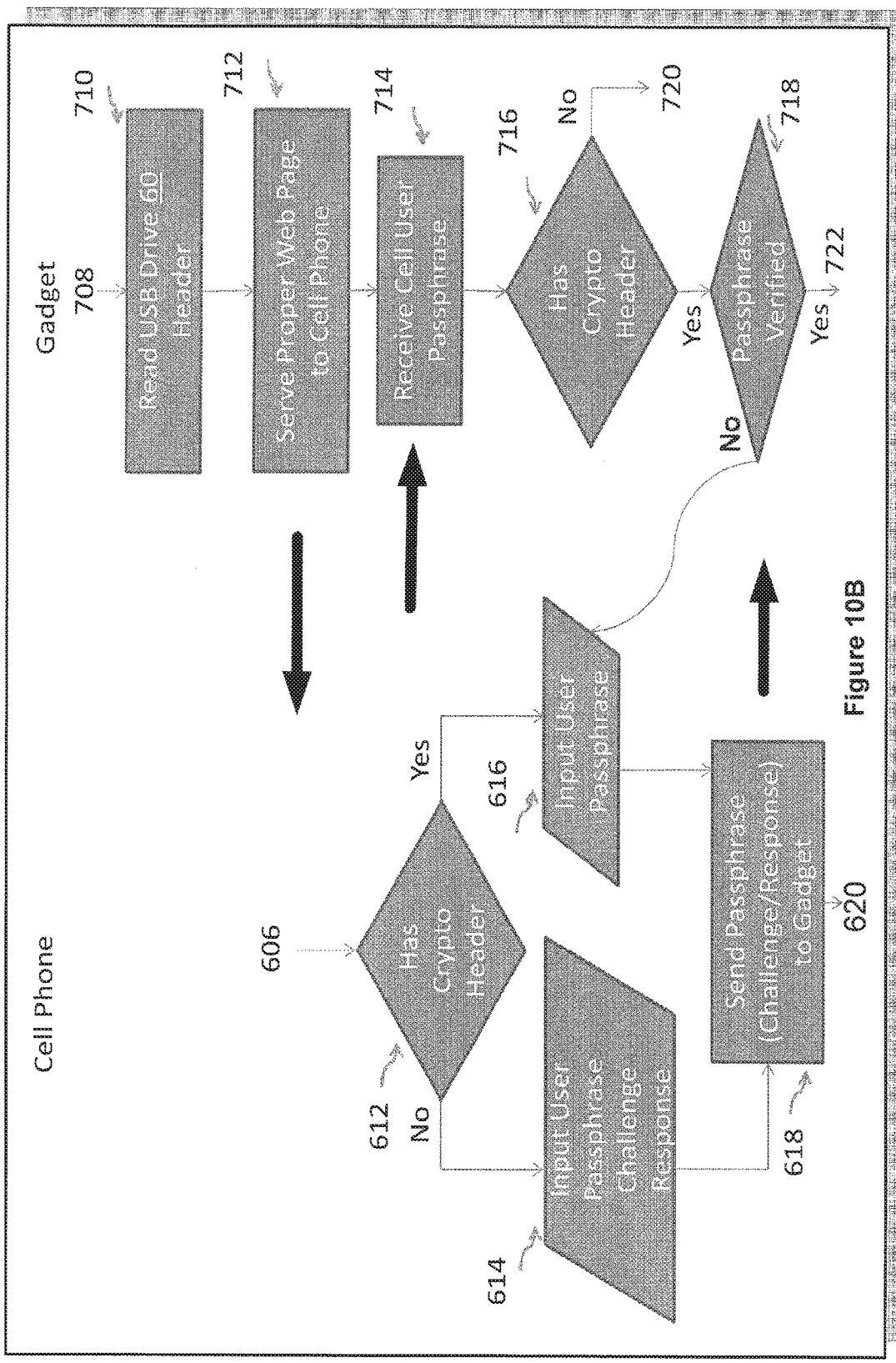
Figure 10C:
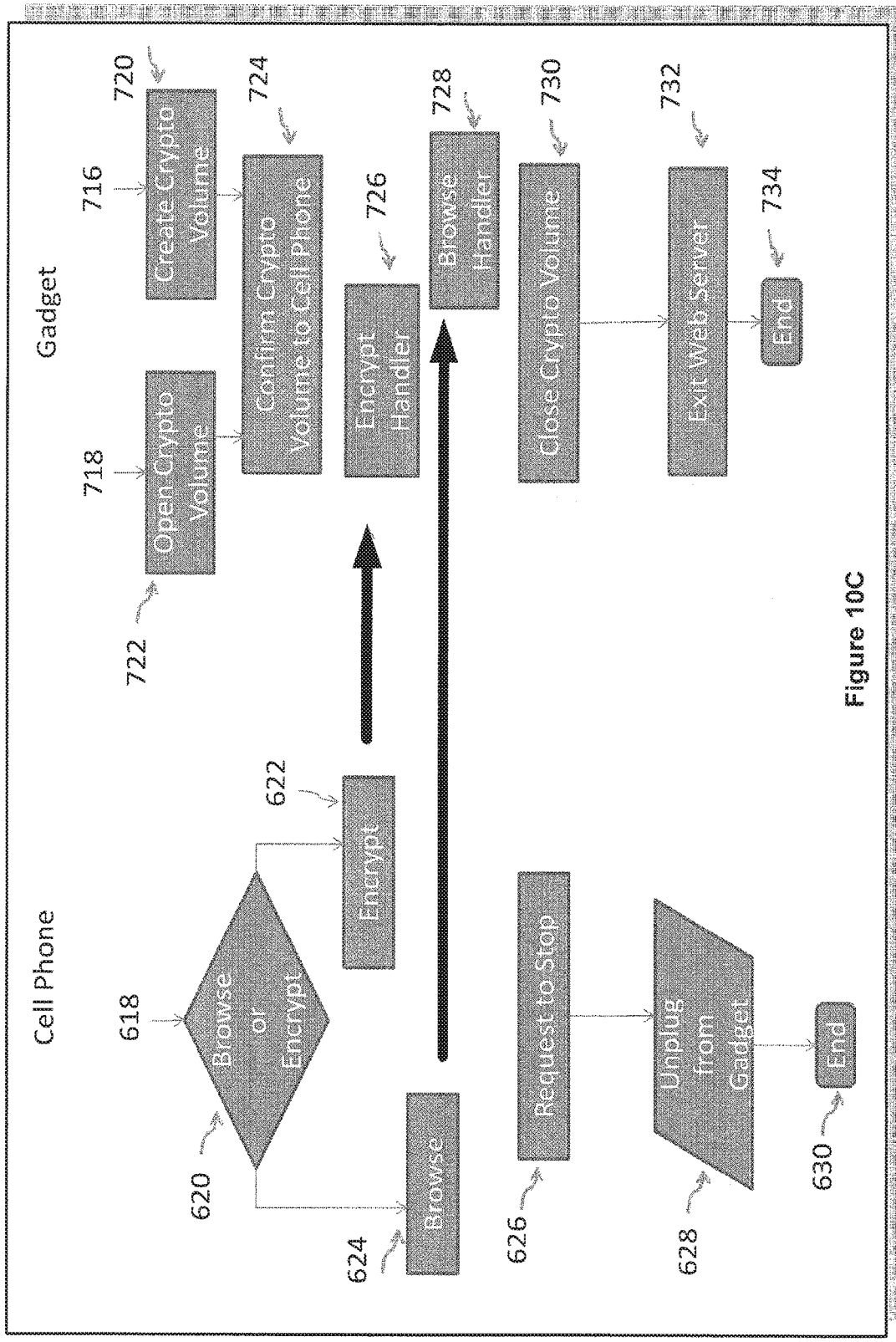

FIGS. 10A-10C are flowcharts illustrating example methods for encryption and decryption of data stored on a mobile device in accordance with some implementations.

Upon detecting a connection with a host (e.g., a smartphone) (700, 702, and 600), a gadget with a connected USB flash drive 60 can load (704) the LINUS OS from its non-volatile memory and create (706) a WIFI direct network. The can gadget can start a web server to handle connections from one or more web browsers running on the smartphone. The smartphone can join (604) the WIFI direct network created by the gadget with a predefined gadget IP address. The smartphone can provide a web browser for a user to browse files.

Upon receiving a connection from a web browser running on the smartphone, the gadget web server reads (710) the first 2 sectors of the USB flash drive to determine whether the flash drive is already encrypted (e.g., using technologies described in the present disclosure). Based on the determination, the gadget web server can return (712) different web pages to the web browser.

If the USB drive is not yet encrypted, the web browser can request user instructions to encrypt the USB drive and provide a passphrase. The gadget web server can create (720) encrypted storage space on the USB drive based on the user-provided passphrase, for example, using the user-provided passphrase as an encryption key. The following example can set up a LUKS device header on the USB flash drive and encrypt the master key with the default cryptographic options (/dev/sdb is the Linux device name for the USB flash drive 60):

cryptsetup -y luksFormat /dev/sdb.

The default cryptographic options may specify which encryption algorithm is to be used. If the USB drive is already encrypted using the technologies described in the present disclosure, the smartphone can authenticate (718) a user for accessing the USB drive, e.g., using a passphrase validation. Once a user-provided passphrase is validated, the gadget server can provide user access to the USB drive. The following example can verify the passphrase, enable user access to the USB storage, and create a dm-crypt device, /dev/mapper/<crypted_container_name>.

The crypted_container_name which is mapped to the USB flash device /dev/sdb.

cryptsetup luksOpen /dev/sdb <crypted_container_name>

The gadget web server can return a web page to the smartphone informing a user that the USB drive has been encrypted and is ready for use. The web page can further provide a user with options to either browse the crypto volume contents or encrypt smartphone data. The gadget web server can invoke (728) the browse handler routine if a user issues a browsing request (624). Alternatively, the encrypt handler routine is invoked (726) to encrypt data and store the encrypted data on the USB drive. Upon a user request, the gadget web server can close the USB drive for user access, e.g., using the command "cryptsetup luksClose." The gadget server can provide a safe-to-eject confirmation page on the smartphone to inform (628) a user to unplug the gadget from the smartphone.

Figure 11:
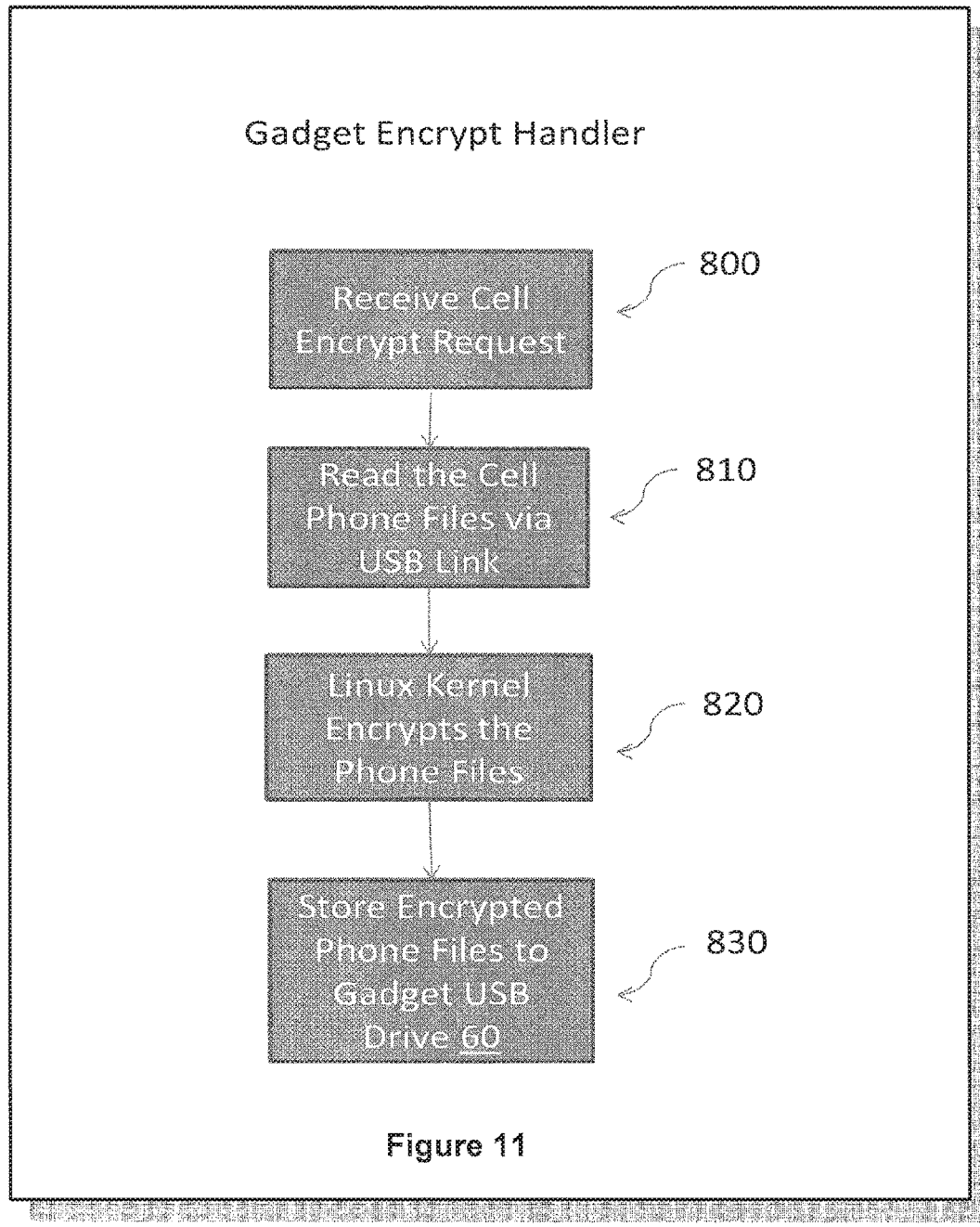
FIGS. 11-12 are flowcharts illustrating example methods for encrypting data stored on a mobile device using a gadget.

FIG. 11 is a flowchart illustrating an example method for encrypting data stored on a mobile device using a gadget. As shown in FIG. 11, upon receiving (800) an encryption request, a gadget web server can read (810) data stored on a smartphone, e.g., using an IP-over-USB link. The Linux kernel dm-crypt device can encrypt (820) data received from the smartphone and store (830) the encrypted data on a USB device.

Figure 12:
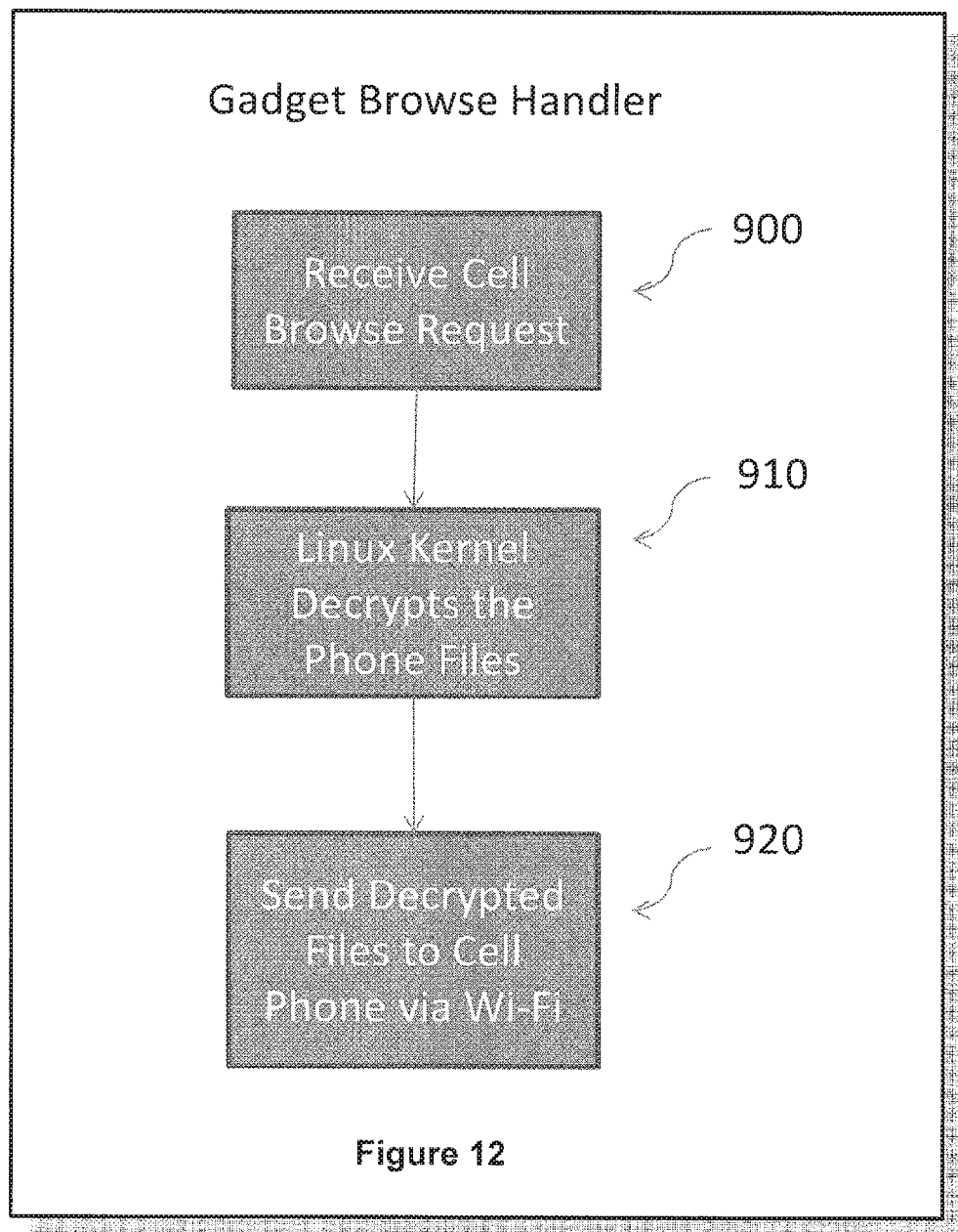

FIG. 12 is a flowchart illustrating an example method for decrypting data using a gadget and providing the decrypted data to a mobile device. As shown in FIG. 12, upon receiving a user request from a smartphone to access encrypted data, a gadget web server can retrieve the encrypted data (e.g., from a USB drive), decrypt (910) the encrypted data using a Linux kernel, and provide (920) the decrypted data to the smartphone for user access.

Figure 13:
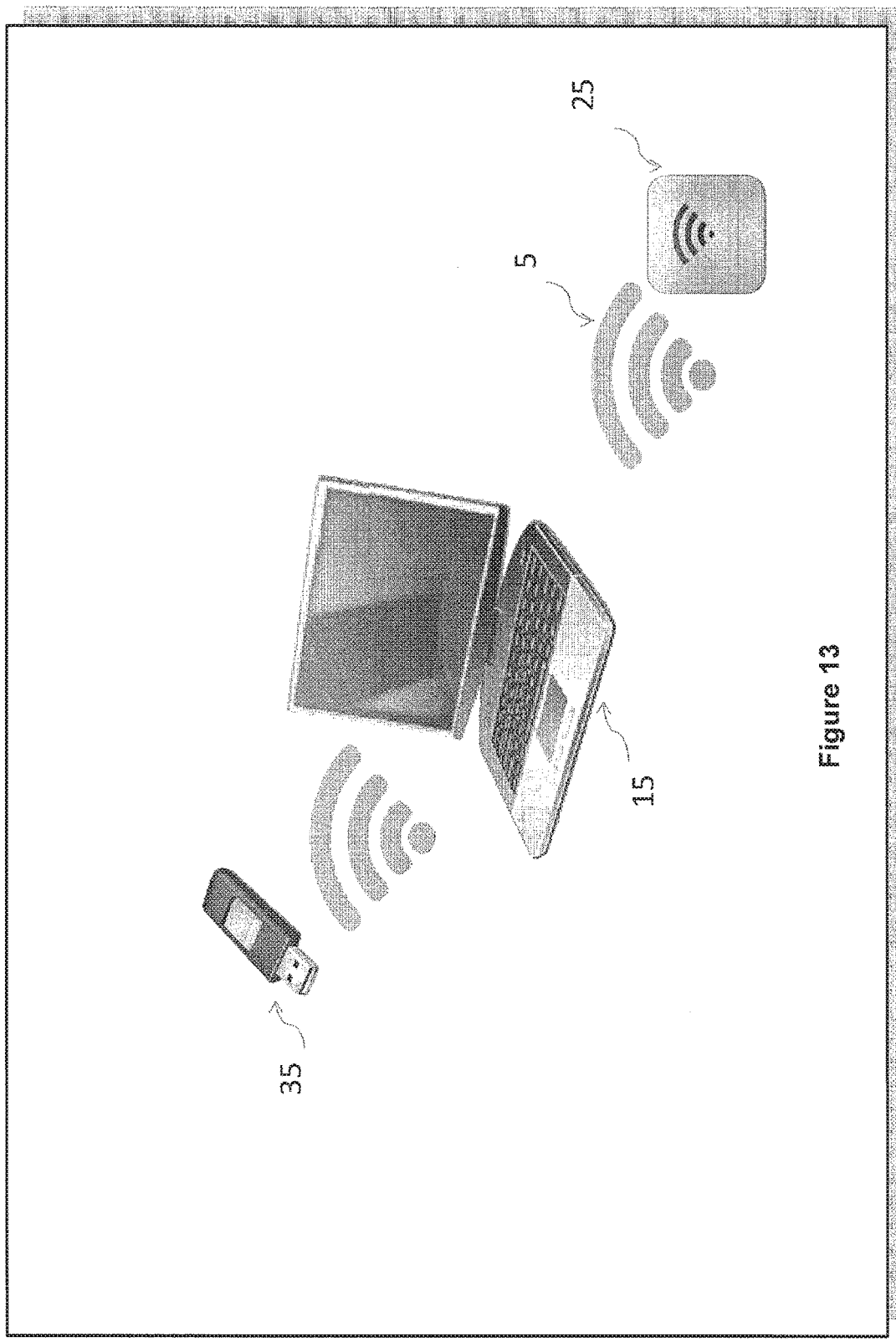
FIG. 13 is a flowchart illustrating an example method for data encryption and decryption using a wireless network.

FIG. 13 is a flowchart illustrating an example method for data encryption and decryption using a wireless LAN. A host computer and a gadget may be connected through a wireless LAN. These technologies are advantageous because a single gadget can provide data encryption and decryption service to several host computers e.g., simultaneously, desirable for an enterprise environment.

Figure 14:
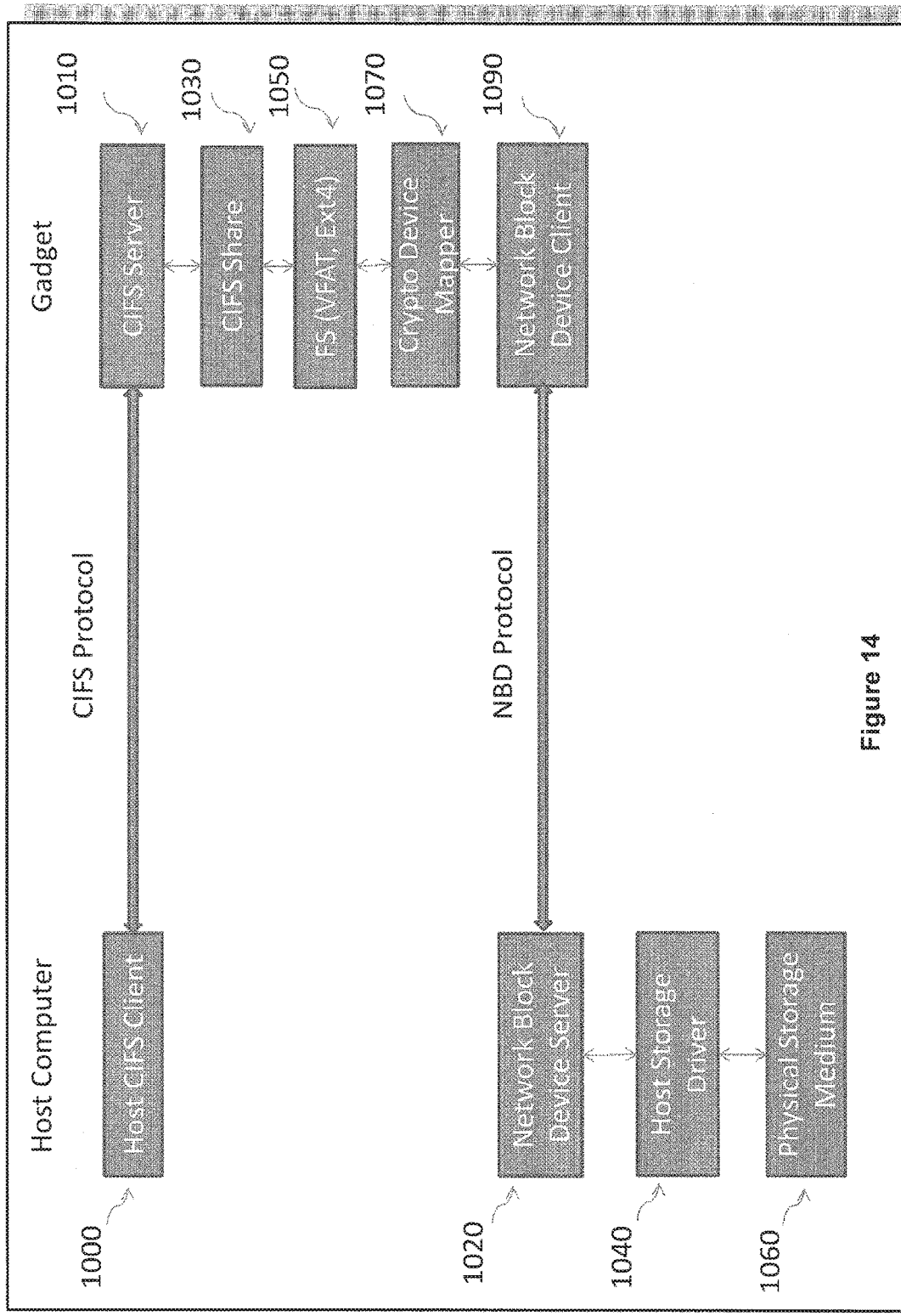
FIG. 14 is a block diagram illustrating an example encryption and decryption device.

FIG. 14 is a block diagram illustrating an example encryption and decryption device. A host computer can use a Common Internet File System (CIFS) client to access CIFS data encrypted or decrypted by a gadget. For example, a host Network Block Device (NBD) server 1020 can enable a gadget to access a physical storage space 160 of the host, e.g., using a host storage driver 1040. The gadget CIFS server 1010 can communicate with the host CIFS client and provide access to CIFS shares 1030. The CIFS shares can be created and organized in various file formats, e.g. the VFAT format or the Ext 4 format 1050. The gadget crypto device mapper 1070 can be a LINUX kernel driver that encrypts and decrypts data. The gadget Network Block Device (NBD) client 1090 can be a LINUX kernel module that forwards gadget requests to the host NBD server 1020.

These technologies are advantageous, because they can enable a host computer to access a local storage space as if it is a network storage space provided by a gadget. When the host writes data to the "network" storage space, the gadget can encrypt the data and store the encrypted data locally on the host computer while appearing to the host that the data are stored remotely on a network storage (e.g., a remote data server). When the host reads data from the "network" storage space, the gadget can decrypt the data stored locally on the host computer and provide the decrypted data to the host. These technologies can provide encryption and decryption service to devices connected to a gadget through a wireless local area network, which is common in an enterprise environment.

Figure 15A:
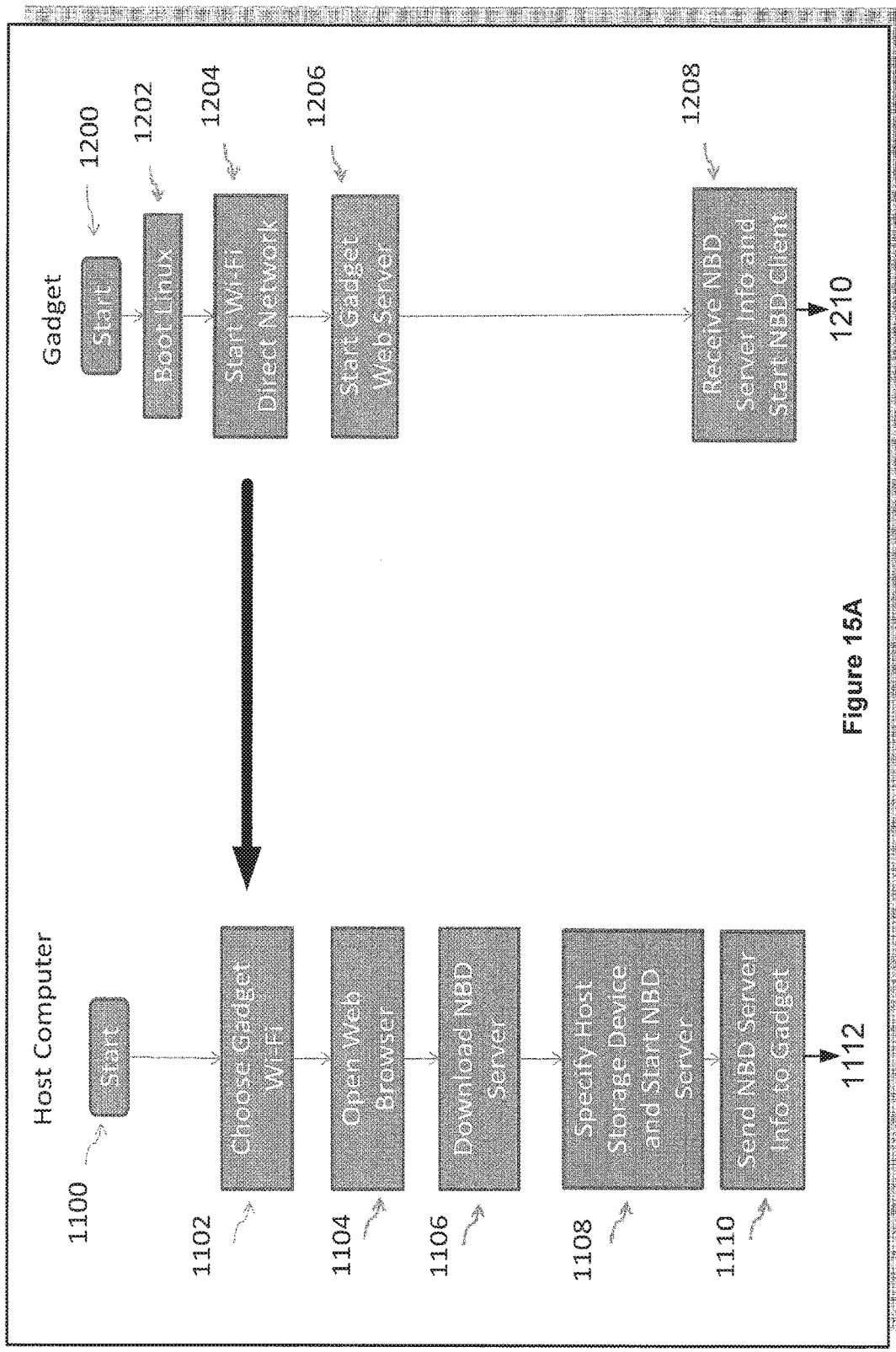
FIGS. 15A-15C are flowcharts illustrating example methods for data encryption and decryption.
Figure 15B:
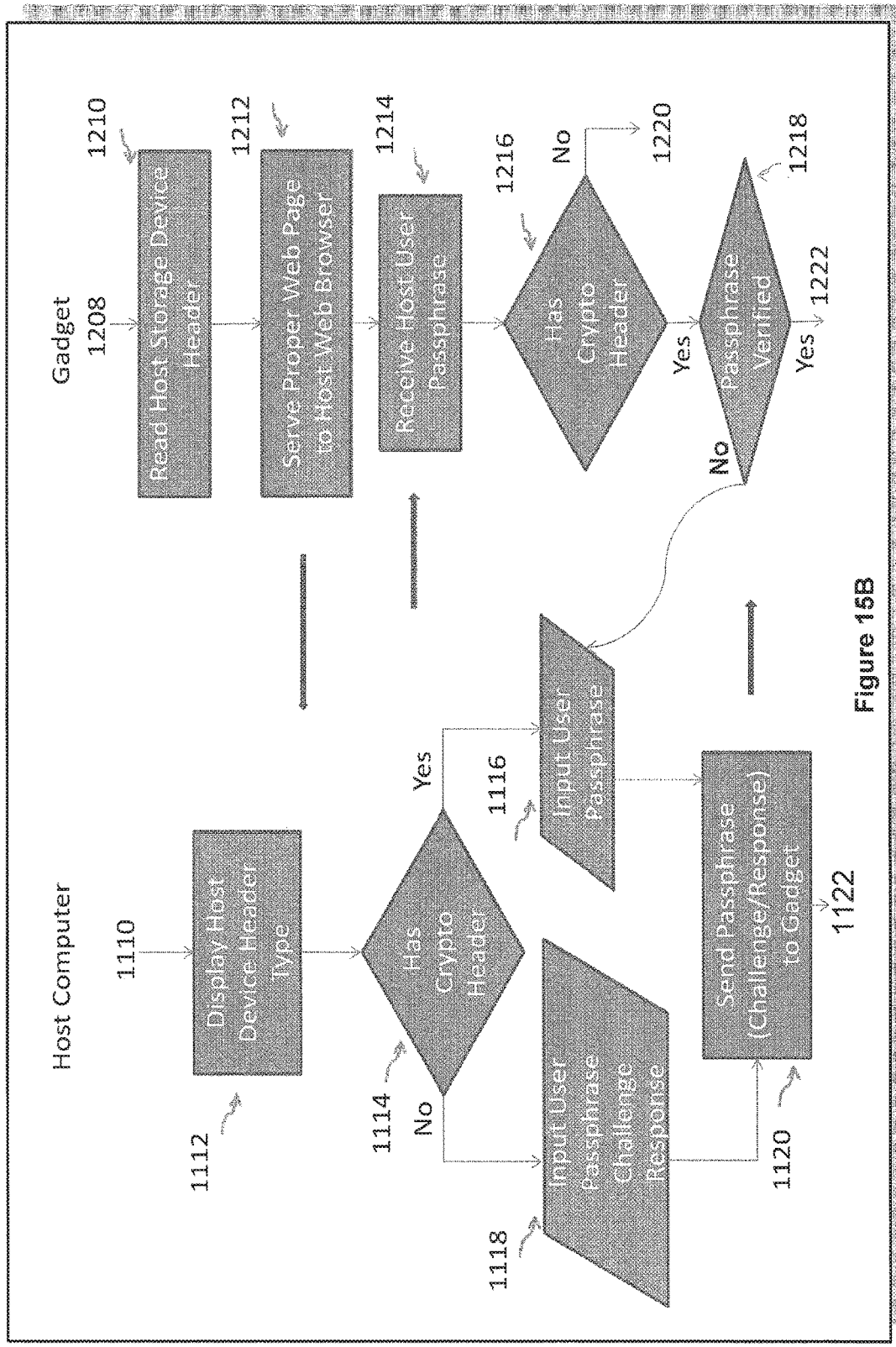
Figure 15C:
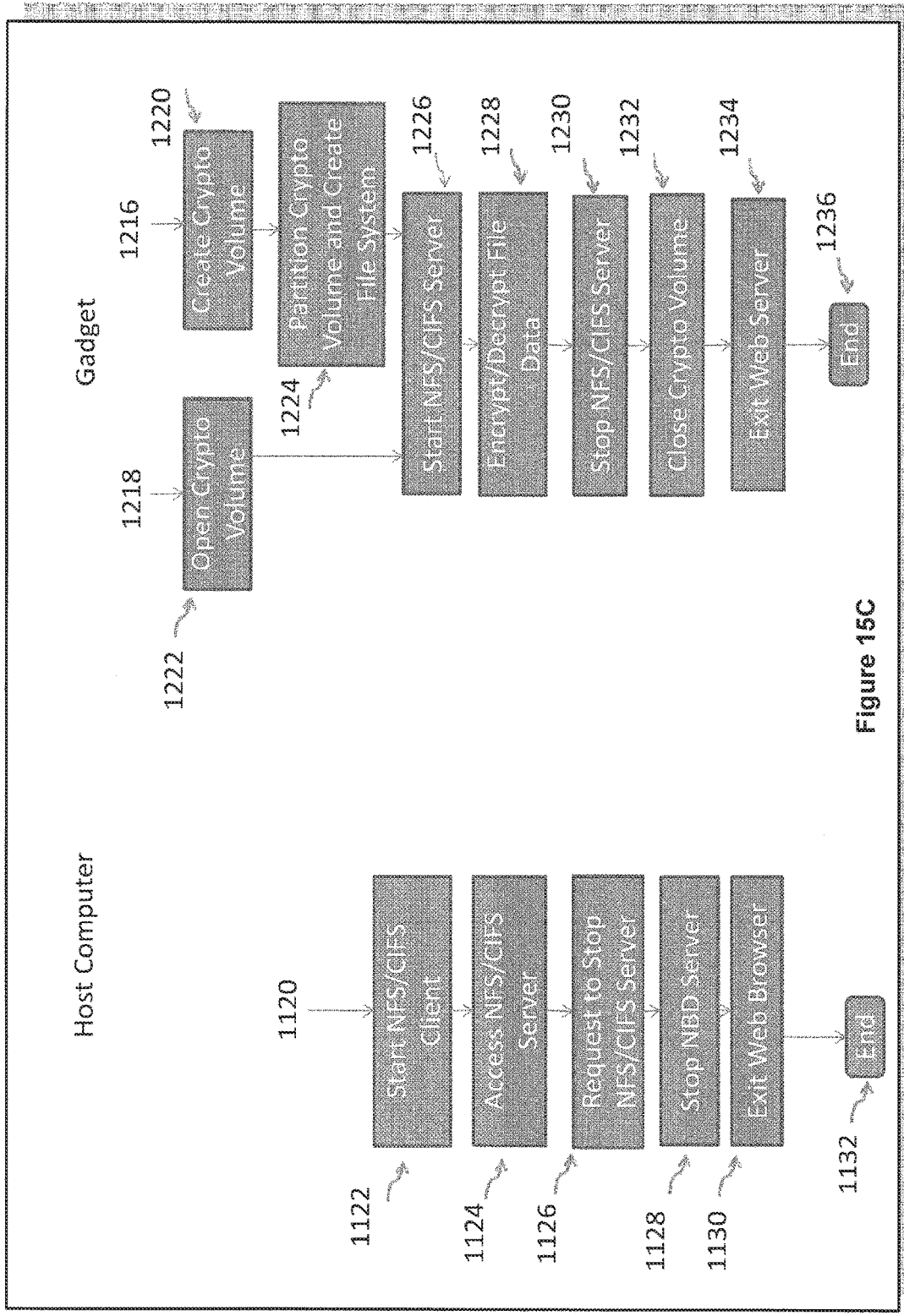

FIGS. 15A-15C are flowcharts illustrating example methods for encryption and decryption. Once powered on (1200), the gadget may load (1202) the LINUX OS from its non-volatile memory and creates a Wi-Fi direct network (1204). A gadget web server is created (1206) and can handle connection from a host. The gadget web server's home page can contain an HTML link to enable a host web client to download NBD server executable files for execution on the host.

Once powered on (1100), a host can interact with the gadget through the WIFI direct network. The host can join the Wi-Fi direct network (1102) with a predefined gadget IP address and invoke a web browser (1104). The host can further download the NBD server executable files from the gadget. The host can prompt a user to provide a storage device name (1108) and to select a host storage space that is either already encrypted or to be converted into one.

The host web client can create a thread for running the NBD server on the host for accessing the selected storage space. A NBD server can be a software program that provides access to an image of a file system or a disk partition on the host by a remote system over a network. An NBD server can also enable the gadget to access a host storage space in the same way that gadget access a local storage. Once the NBD server thread is created, the host web client can send the NBD server's TCP port number to the gadget web server (1110). The host web client can receive, from the gadget web server, a host storage space's cryptographic header information, which indicates whether the host storage space has previously been encrypted or not.

Figure 5B:
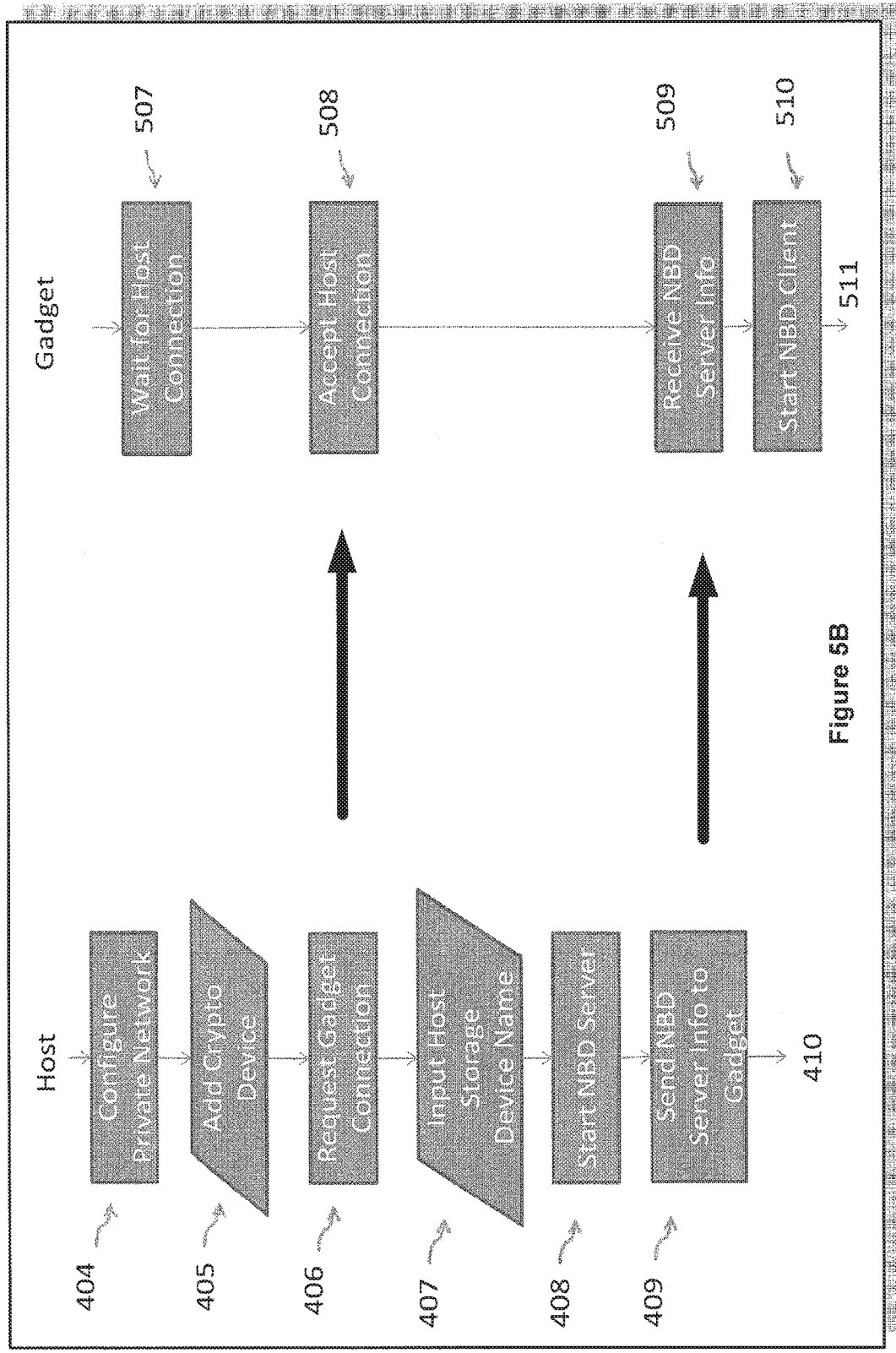
Figure 5C:
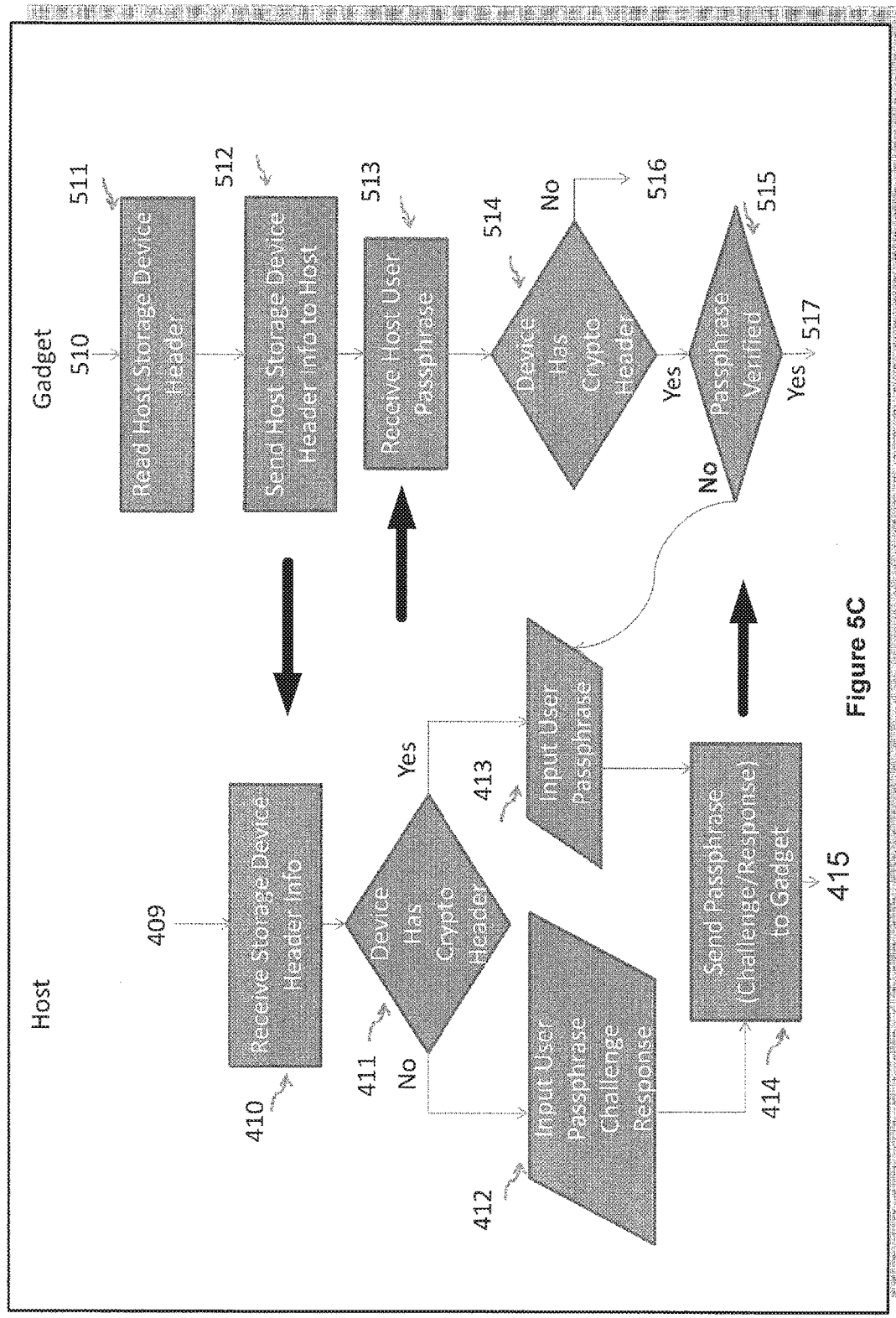
Figure 5D:
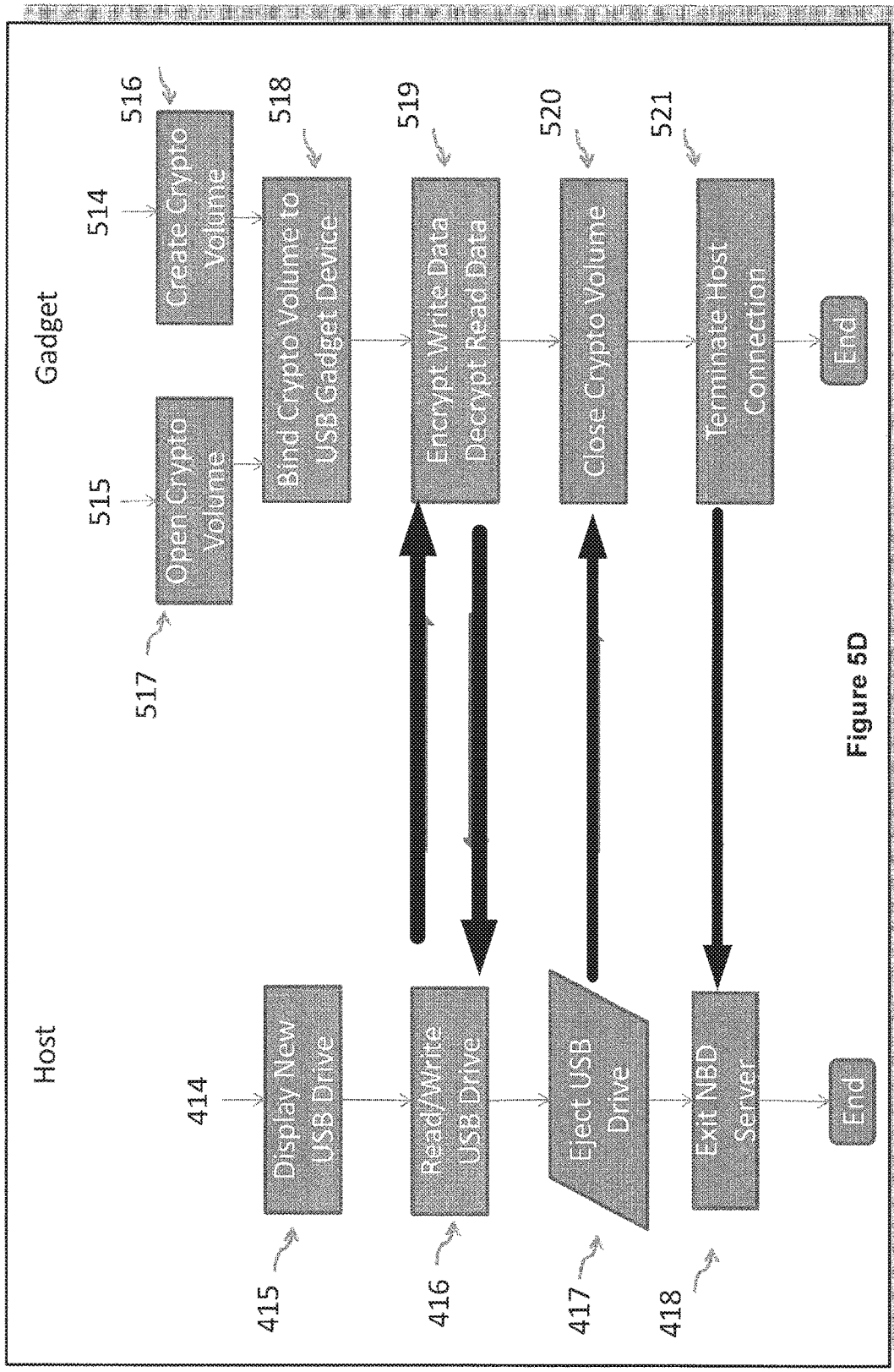

If the host storage space is not encrypted, the gadget can encrypt the host storage space using technologies described in the present disclosure with reference to FIGS. 5A-5C. The gadget can format the newly encrypted space with a file system, e.g. VFAT or Ext4. If, alternatively, the host storage space is already encrypted, the gadget can authenticate a user for access to the host storage space using the technologies described with reference to FIGS. 5A-5C. The gadget web server can start a network file server, e.g. a CIFS or NFS server, and notify a host client that the web server is ready for access.

The web client, when detecting that the gadget web server is ready, can start a corresponding network file system client (1122), which creates a host network drive mapped to the network file system server on the gadget. Access to the network file system server by the host computer (1124) can be managed by the gadget's dm-crypt device (1228), which encrypts data written to the encrypted space and decrypts data read from the encrypted space.

When a user requests to terminate access to the network file system server, the host client can send the request to the gadget (1126). In response, the gadget web server can stop the network file server program (1230), close access to encrypted host storage space (1232), and exit the web server (1234), thereby terminating the connection between the gadget and the host.

Figure 16:
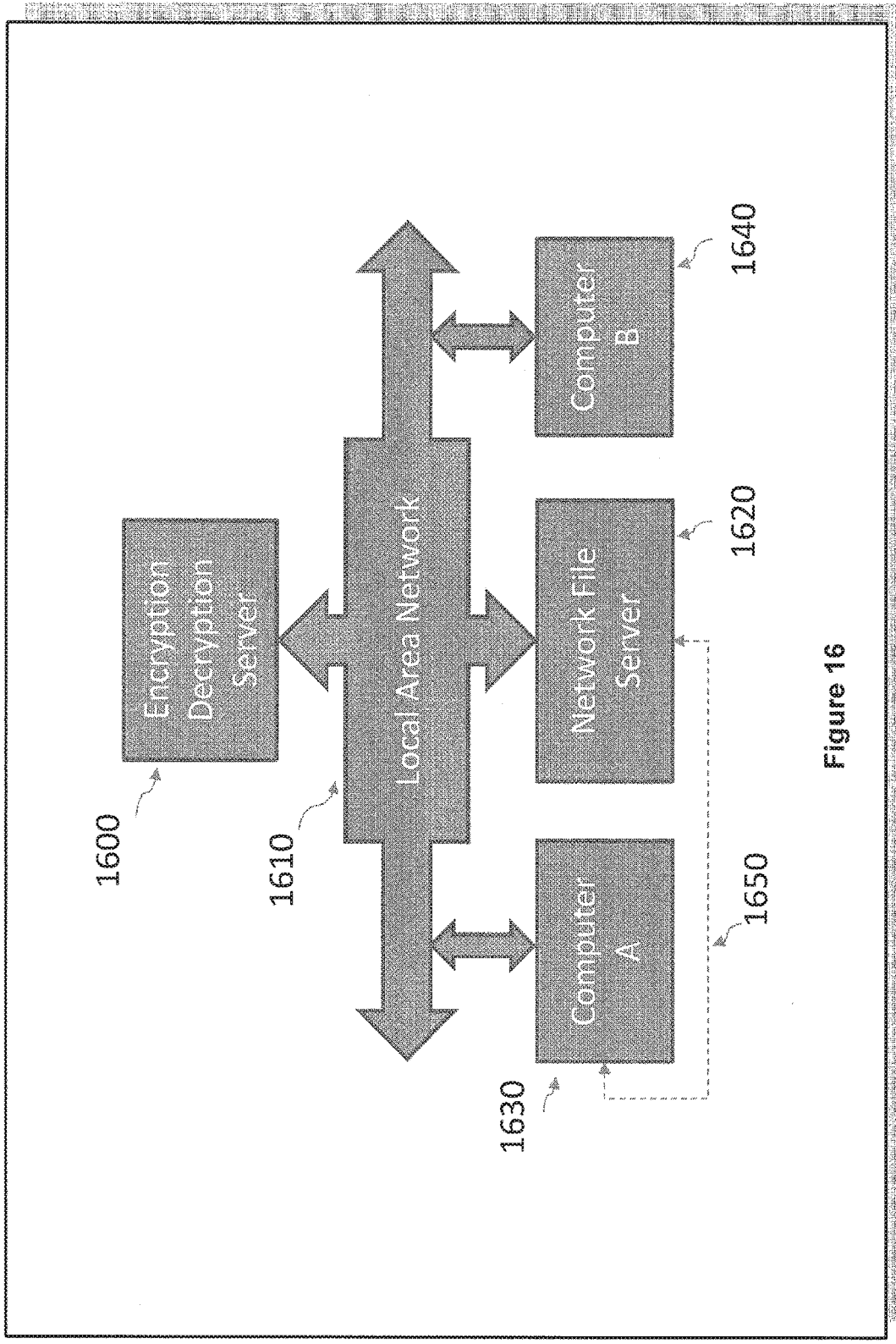
FIG. 16 is a block diagram illustrating an example encryption and decryption system.

FIG. 16 is a block diagram illustrating an example encryption and decryption system. An example encryption and decryption system may be implemented in a Local Area Network (LAN) to provide data encryption and decryption services to computing devices within the LAN. In some implementations, the encryption/decryption server 1600 is connected to a network file server 1620, a first computing device (e.g., the computer A 1650) and a second computing device (e.g., the computer B 1640), via the LAN 1610.

The computer A 1650 may access, via the LAN 1610, files or other data stored on the network file server 1620, using one or more data sharing protocols 1650 (as shown by the dotted line), for example, a Network File System (NFS) or a Common Internet File System (CIFS) protocol. The computer B 1040 may store its data locally. Data stored on the network file server 1620 and on the computer B 1640 may be encrypted and stored on their respective local storage devices; the encryption server 1600 may (1) encrypt the data being written to and (2) decrypt data being read from the local storages of the network file server 1620 and of the computer B 1640. This implementation provides a cost-efficient and yet high-performance secure data storage solution to data encryption/decryption in an enterprise data processing environment, because a single, but dedicated and high performance, encryption/decryption server may simultaneously provide encryption/decryption service to a large number of computers located in the same network.

Figure 17:
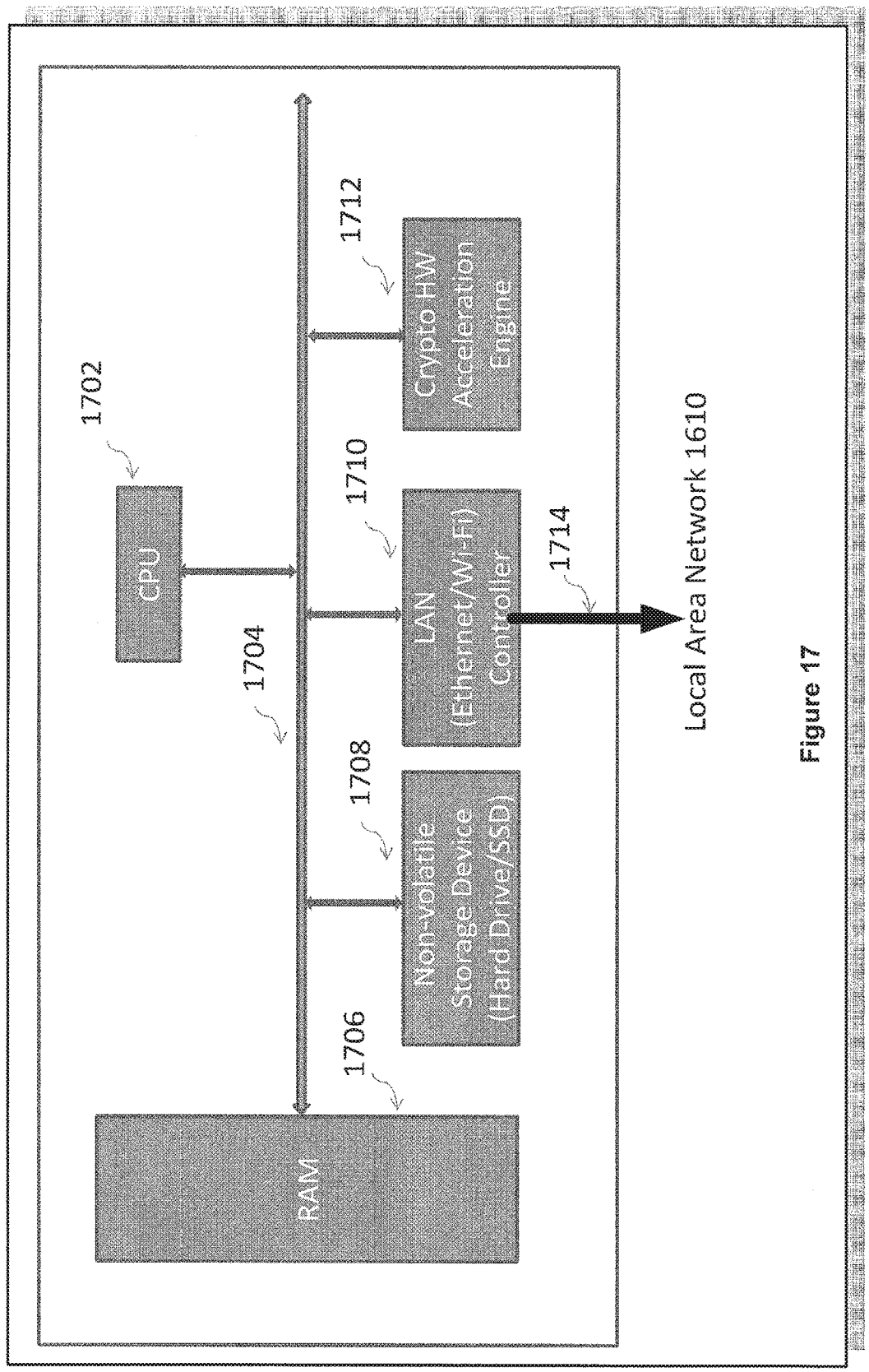
FIG. 17 is a block diagram illustrating an example encryption and decryption server computer.

FIG. 17 is a block diagram illustrating an example encryption and decryption server, for example the encryption/decryption server 1600. An example encryption and decryption server may include a computer system running a Linux server operating system (OS) and, as shown in FIG. 17, may include, a central processing unit (CPU) 1702, a random access memory (RAM) 1706, a non-volatile storage device 1708 for storing software programs and their associated data, a LAN (e.g., an Ethernet or Wi-Fi network) controller 1710, and a system bus 1704 connecting these components. In some implementations, a dedicated hardware cryptography acceleration controller 1712 may be provided in addition to the CPU 1702 to enable a high data throughout.

Figure 18:
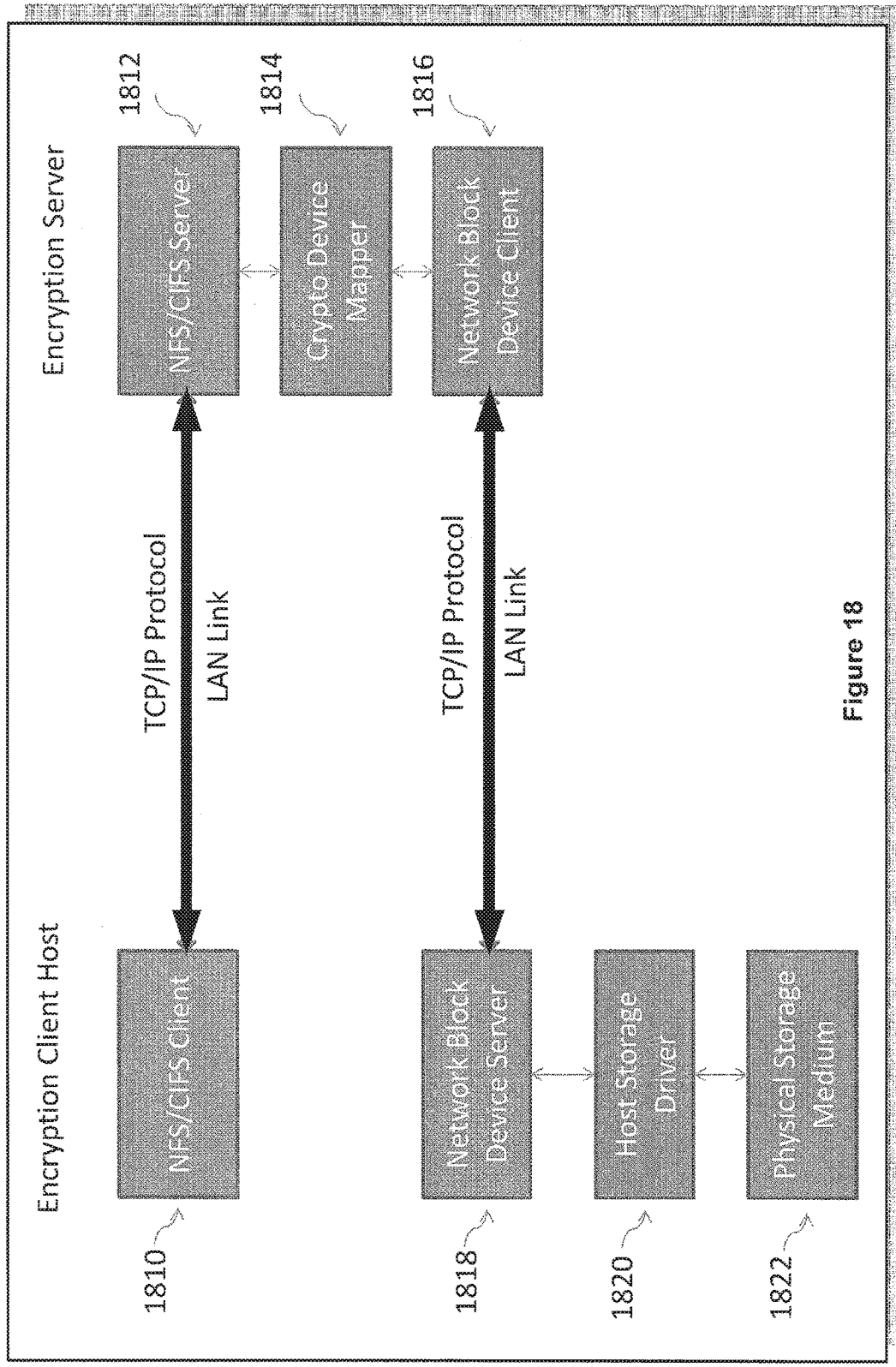
FIGS. 18 and 19A-19D are flowcharts illustrating example interactions between a client host and an encryption and decryption server.

FIGS. 18 and 19A-D are flowcharts illustrating example interactions between an encryption client host and an encryption server. As shown in FIG. 18, the NFS/CIFS client module 1810 may provide the host computer access to the NFS/CIFS server module 1812 running on the encryption server. The host network block device (NBD) server 1818 may enable the encryption server to access the host storage devices via a TCP/IP connection and may invoke the host storage driver 1820 when accessing the host storage medium 1822. The NFS/CIFS server 1812 may implement a distributed file access system, which allows a user on a client computer to access data remotely stored on a different computer in a manner similar to accessing data stored locally on the client computer.

The encryption server may include a crypto device mapper 1814, which may be implemented using a Linux kernel driver that encrypts/decrypts passing-through data, e.g., data flow between the client 1810 and the physical storage medium 1822. The encryption server may also include a Network Block Device (NBD) client 1816, for example, a Linux kernel module that forwards the encryption server's requests to the host NBD server 1818 for accessing data stored on the physical storage medium 1822. The NBD communications (e.g., between the client 1810 and the server 1812 as well as between the client 1616 and the server 1818) may implemented through TCP/IP connections over an LAN link.

This implementation enables the encryption client host to access local storage devices as if these storage devices are network drives located on the encryption server. For example, a user may create a disk partition P on the host computer's hard disk to store encrypted data located. The encryption server, once connected with the client host, may create a virtual network drive (e.g., a network hard drive V) on the client host and map all data operations on the virtual hard drive V to the local disk partition P. For example, data writes to the virtual network drive V may be encrypted remotely by the encryption server and saved locally on the partition P of the client host; data reads from the partition P may be decrypted remotely by encryption server and provided to the client 1810.

From a user's perspective, the virtual network drive V appears to be the unencrypted version of the partition P and is the target of data reads and writes. In other words, the encryption server enables a client device to use its own local storage as a cryptographic volume.

Figure 19A:
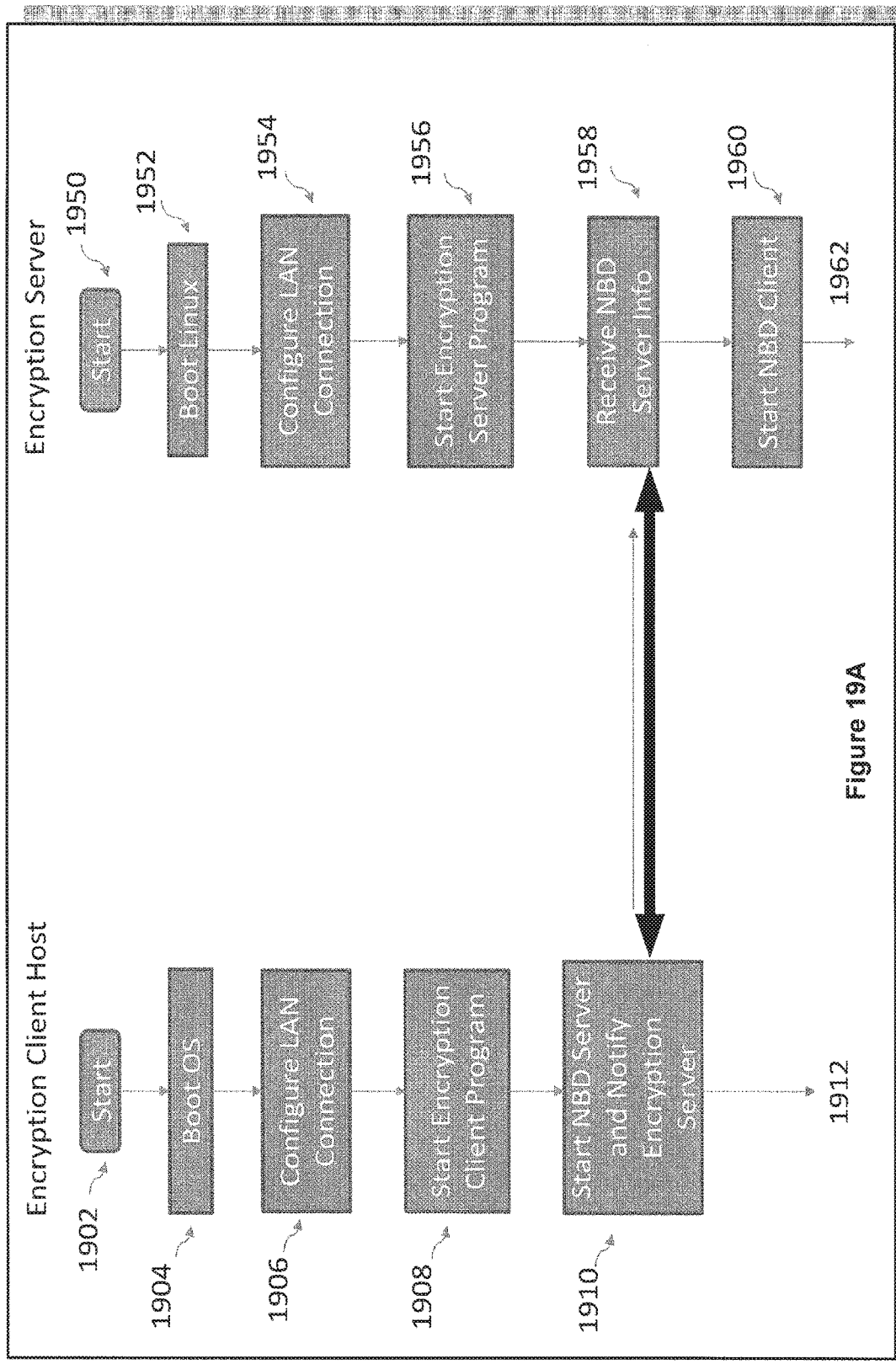

A shown in FIG. 19A, after being powered on (1902), an encryption client host boots up (1904) the operating system stored thereon and configures (1906) a LAN connection. On the encryption server side, after being powered on (1950), the server may boot a Linux operating system the non-volatile storage device 1708 into the RAM 1706, to be executed by the CPU 1702. The encryption server then configures (1954) its LAN connection. Software module running on the client host and the server may interact with each other using a TCP protocol over the LAN connection. A server encryption/decryption module may simultaneously interact with multiple client data access modules. A client data access module may enable a user of a client host to designate one or more host storage devices for conversion in to cryptographic storage volumes and for collecting user passphrases needed for data encryption/decryption as well as access authentication. A host storage device may include a raw disk drive, a partition, a volume or cloud block storage. More than one crypto volume can be created and accessed simultaneously on a single encryption client host.

The encryption server module may enable a client host to perform cryptographic operations and for authenticating user access to the host cryptographic volumes, which may appear on the client host as network drives accessible to the client host. The encryption server module is executed (1956) after the server configures the LAN connection and wait for the encryption client program running on the client host to start up and establish a TCP connection with the encryption client program.

On the encryption client host, a user may execute (1910) the encryption client program to begin providing access to a cryptographic storage device. The encryption client program may create (1960) a new thread for running a Network Block Device (NBD) server program. The NBD server program may provide access to a shared image of a file system or a disk partition on a host computer with a remote Linux system over a network.

Figure 19B:
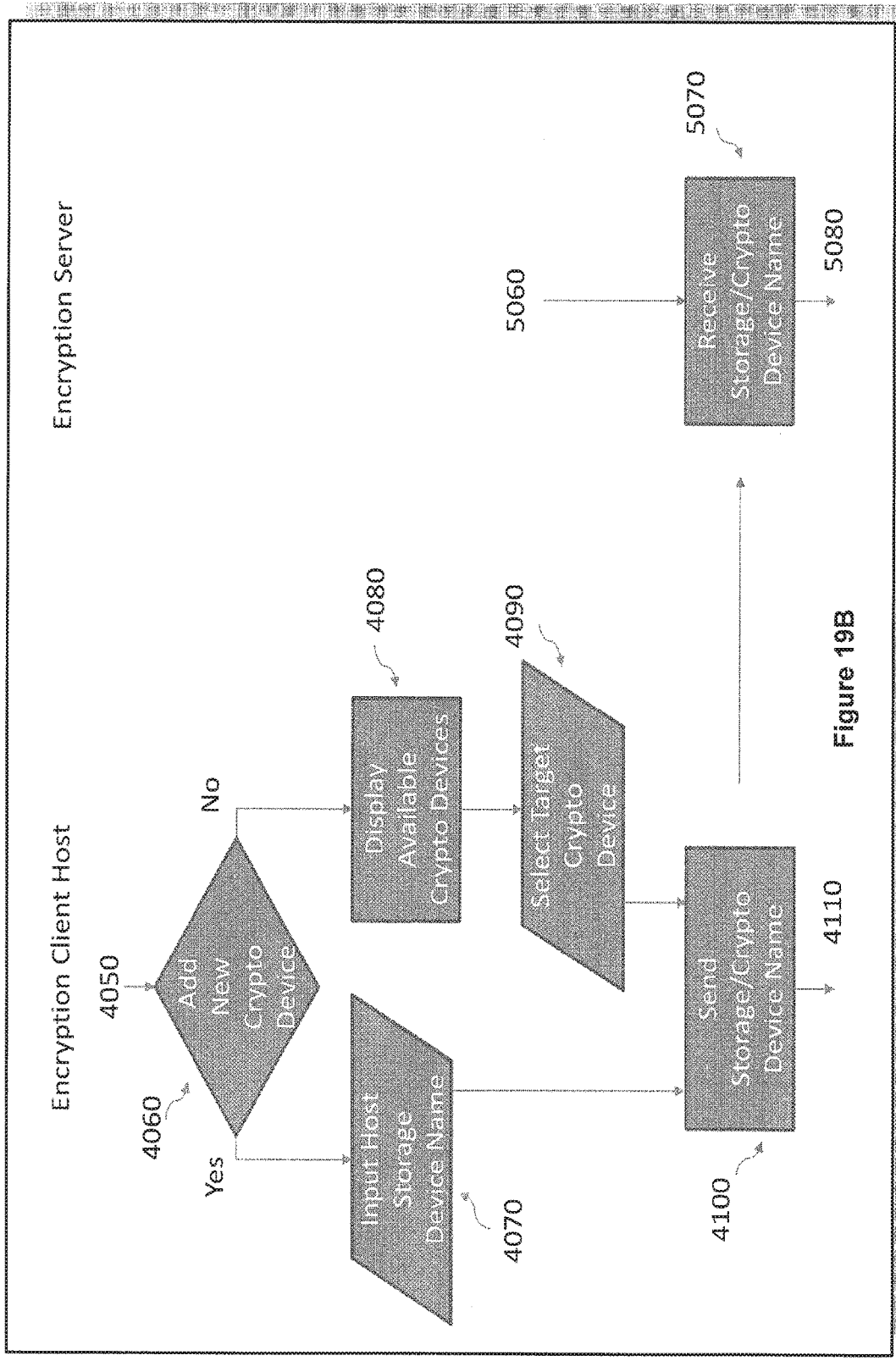
Figure 19C:
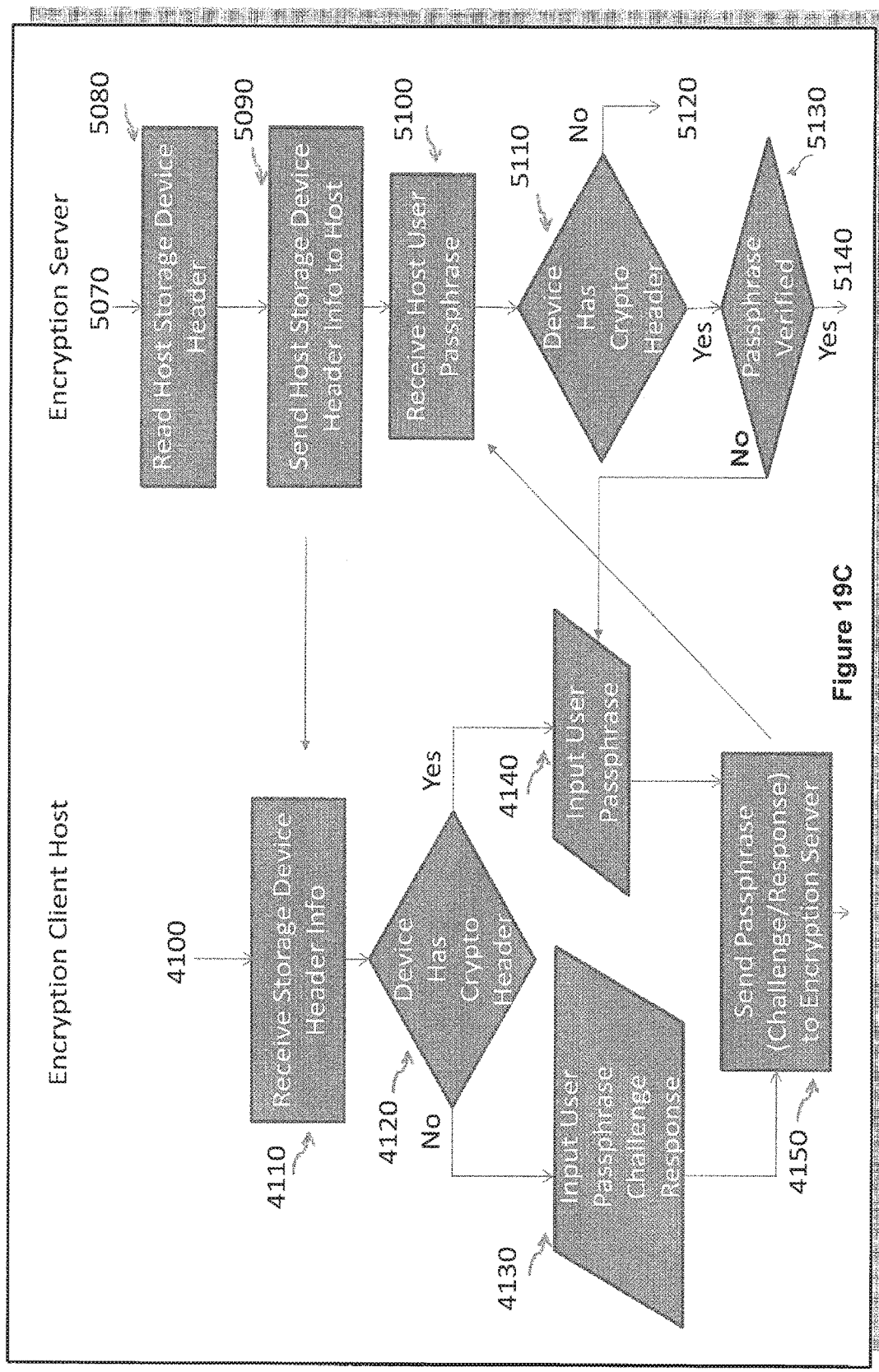
Figure 19D:
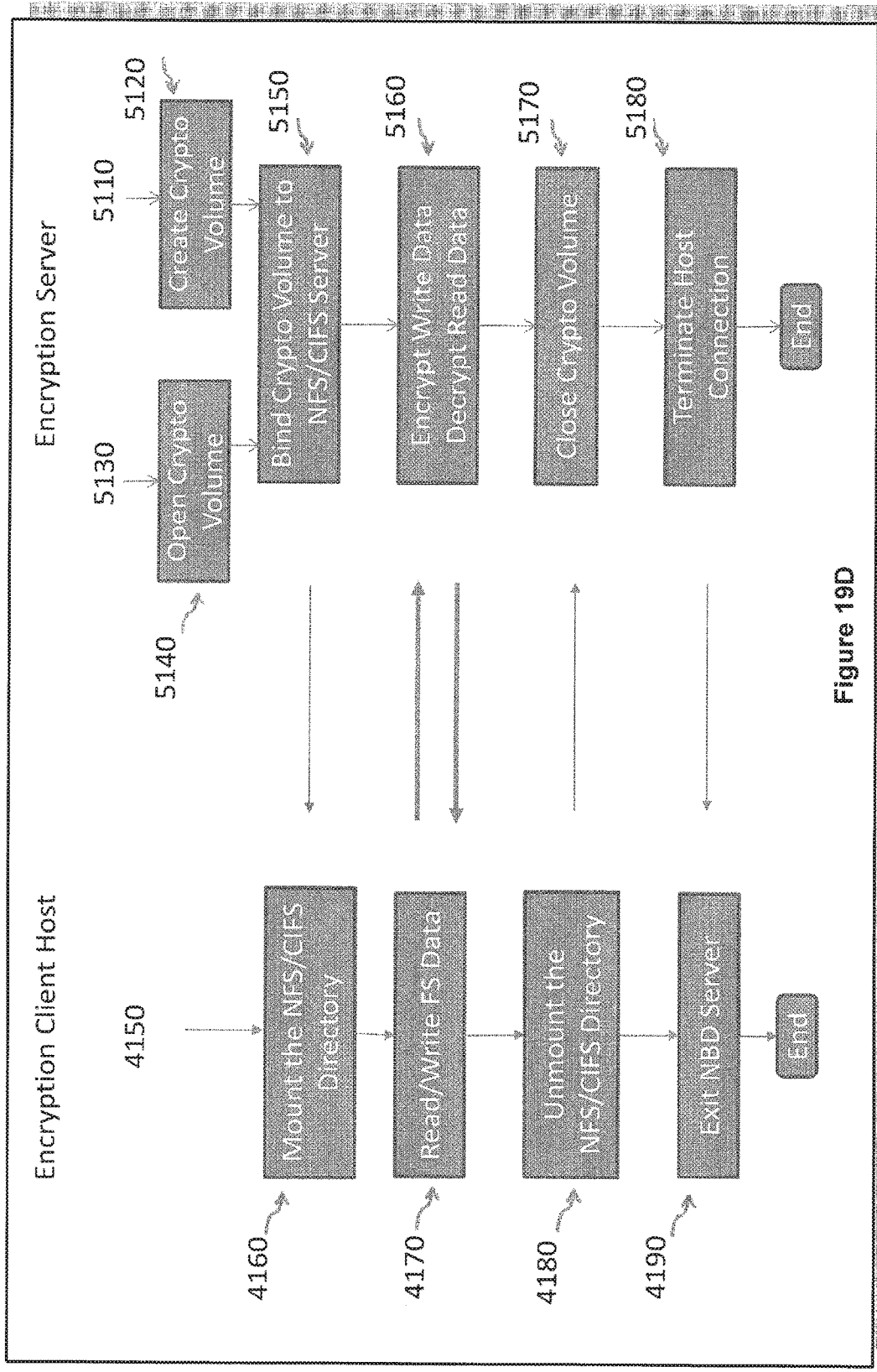

As shown in FIG. 19B, after the NBD server thread is created, the encryption client program sends the NBD server's TCP port number to the gadget server in step 4050. Next, in step 4060, the encryption client program asks the user if a new crypto volume is to be created. If so, the encryption client program prompts the user to input a storage device name in step 4070, specifying the device that is to be converted into a crypto volume. Next, in step 4100, the designated storage device name or label on the encryption client host is sent to the encryption server program.

If a user does not plan to request create a new crypto volume, in step 4080, the encryption client program presents any crypto volumes that are previously created on the client computer. Once the user selects a target device from the available crypto volumes in step 4090, the encryption client program sends the target crypto device name to the encryption server program in step 4100.

Then, the encryption client program waits until the encryption server replies with the encryption client host storage device's cryptographic header information which indicates whether the device has previously been converted to a cryptographic volume.

On the encryption server side, in step 5050, the encryption server program receives the encryption client host NBD server TCP port number and subsequently, in step 5060, starts the NBD client program which sets up the data forwarding between the encryption server and the encryption client storage device. The following example will start an instance of the NBD client that connects to the NBD server with TCP port number 9000 on the encryption client host computer, with the local block device name /dev/nbd0 on the gadget:

nbd-client <host_IP_address>9000 /dev/nbd0

With the NBD server/client connection operational, the encryption server program first receives the target crypto device name from the encryption client in step 5070 and proceeds in step 5080 to read the first 2 sectors of the target crypto device. The 2 sectors shall contain a Linux Unified Key Setup (LUKS) header if the target device is already a cryptographic volume. LUKS specifies a platform-independent standard on-disk format for disk encryption. The LUKS presence indication is subsequently sent by the encryption server program to the encryption client program in step 5090.

In step 4110, the encryption client receives the encryption server message and in step 4120 confirms if the designated encryption client storage device is already a cryptographic volume. If it is not, the encryption client program will prompt for user confirmation for the cryptographic volume configuration which will wipe out any data on the device, and upon user confirmation prompts for user to input a passphrase, in step 4130. Optionally, in step 4130, the encryption client program can ask the user to set up a challenge/response password reset mechanism: in the case of a forgotten password, the challenge-response option will help users to reset their password. If the storage device is already a cryptographic volume, in step 4140, the encryption client program simply prompts the user to input the passphrase that has been accepted when the volume is first configured. Next, the passphrase and potentially the challenge/response pair information are sent to the encryption server in step 4150.

On the encryption server side, in step 5100, the encryption server program receives the encryption client user passphrase. Based on whether the encryption client storage device already has a crypto header, determined in step 5110, the encryption server program takes different actions at this point. If the storage device does not have a crypto header, the encryption server will start the crypto volume configuration in step 5120. The following example will set up the LUKS device header on the NBD block device and encrypts the master-key with the default cryptographic options:

cryptsetup -y luksFormat /dev/nbd0

On the other hand, if the encryption client storage device does have a crypto header, the encryption server program validates the user passphrase before unlocking the crypto volume, in step 5130. Once the passphrase is validated, the encryption server opens the crypto volume for user access, in step 5140. The following example will verify the passphrase and opens the crypto volume that is created in step 5120. In addition, it also creates a dm-crypt device, /dev/mapper/<crypted_container_name>, which is mapped to the local NBD device /dev/nbd0 which is attached to the remote storage device on the encryption client computer.

cryptsetup luksOpen /dev/nbd0<crypted_container_name>

Next, the crypto volume needs to be associated with the NFS/CIFS server so that any user access to the network drive on the encryption client computer will be forwarded to the crypto volume on the encryption server. This is accomplished in step 5150 by mounting the dm-crypt device <crypted_container_name>, following the NFS/CIFS server configuration procedures. Also in step 5150, the encryption server program sends the crypto volume's NFS/CIFS directory name to the encryption client program.

On the encryption client host computer, as shown in step 4160, the encryption client program receives the NFS/CIFS directory name and mount it to the local file system on the encryption client host, for example using command "mount <encryption_server_IP>:<encryption_server_directory_name>". As shown in step 4170, a user on the encryption client computer can perform file operations on the network drive that are allowed on the NFS/CIFS server, such as folder/file creation, edit, copy and remove. Data to be written to the network drive may be encrypted and data to be read from the network drive may be decrypted automatically. In contrast with software-based data encryption and decryption technologies which rely on the host CPU to perform often times complex cryptographic operations, these resource-intensive data operations may be performed by the encryption server using the Linux kernel crypto API. These techniques are technically advantageous for at least the following reasons. First, cryptographic cyphers that are supported by the Linux kernel can be used for the disk data encryption/decryption, including custom cryptographic libraries. Second, cryptographic operations can be performed using specialized hardware accelerators, resulting in reduced CPU utilization rates and higher crypto operation performance.

When the NFS/CIFS network drive is unmounted on the encryption client host computer in step 4180, for example at the end of the crypto volume access, the encryption server program may close the crypto volume in step 5170, using the following instructions:

cryptsetup luksClose <crypted_container_name>

Finally, in step 5180, the encryption server program disconnects from the NBD server on the encryption client host which in turn terminates the NBD server for the corresponding encryption client host storage device in step 4190. Example instructions for deleting the NBD client, triggering the NBD server/client disconnection may be as follows:

nbd-client -d /dev/nbd0

Figure 20:
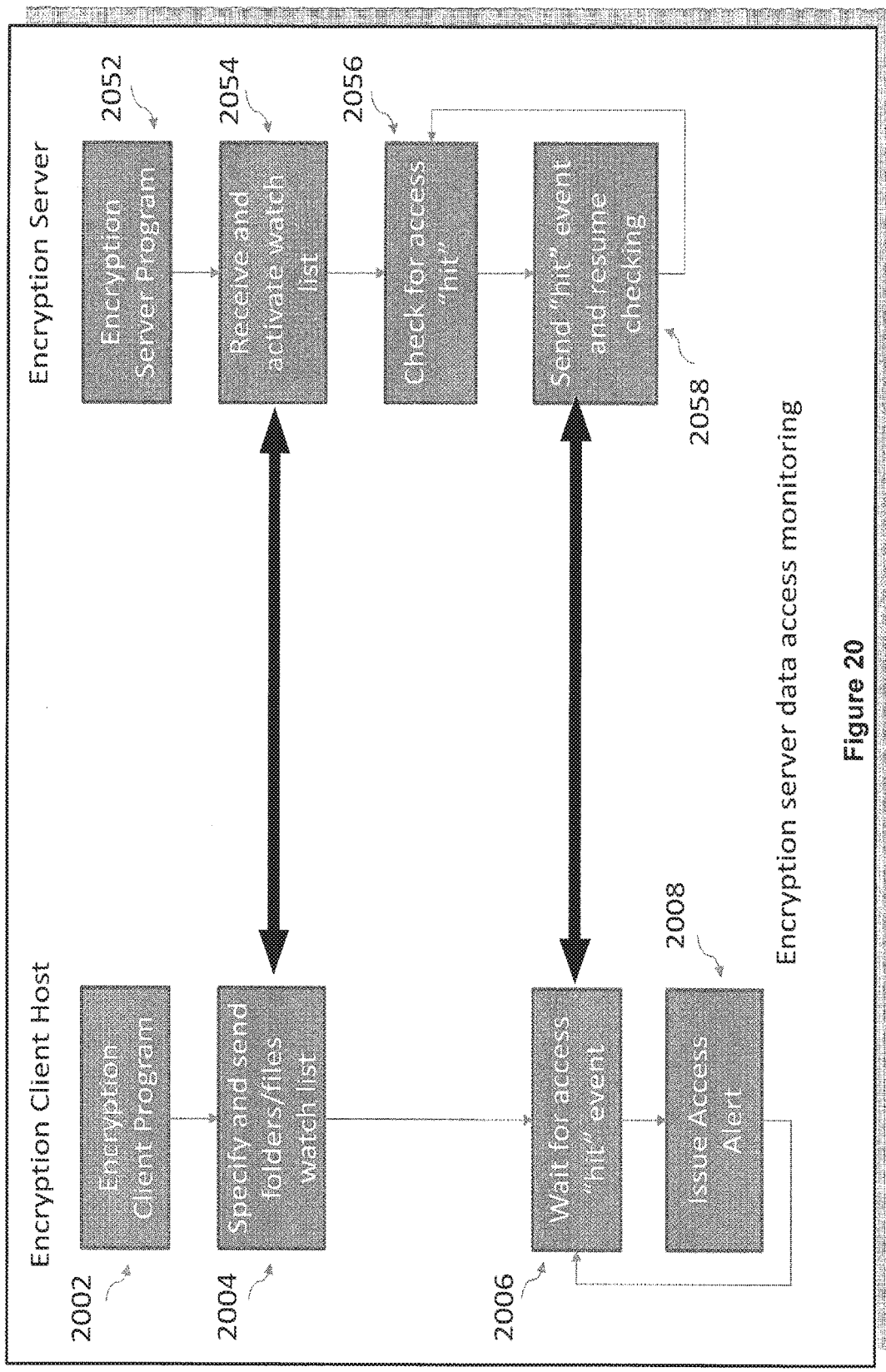
FIG. 20 is a flowchart illustrating example data access monitoring operations involving a client host and an encryption and decryption server.

FIG. 20 is a flowchart illustrating example data access monitoring operations involving a client host and an encryption server. A data access monitoring feature may be provided based on a requirement that all user data accesses to an encrypted storage device pass through the encryption server. An encryption client program may prompt a user to select (2004) one or more folders or individual files in a directory (e.g., an NFS/CIFS director) for data access monitor purpose. For example, a user may include the files or folders that need to be access monitored or controlled on a watch list. The encryption server program may, on a predefined schedule, watch (2054) for access to the selected files or folders. Upon a detected access match (2056), the encryption server may generate a hit event message including the target file/folder name and send (2058) the event message to the encryption client. The encryption client, after receiving (2006) the hit event message, may generate (2008) an alert to the user or a system administrator of the client host, for example, to report a potential data breach or an attempted unauthorized access. The alert may be either a pop-up window or a text/SMS message. The client host may also, based on a generated alert, identify the culprit program or malware in a substantially real-time manner. These functionalities may provide an active defense against data breaches, as opposed to passively prevent or denying suspicious data access.

Figure 21:
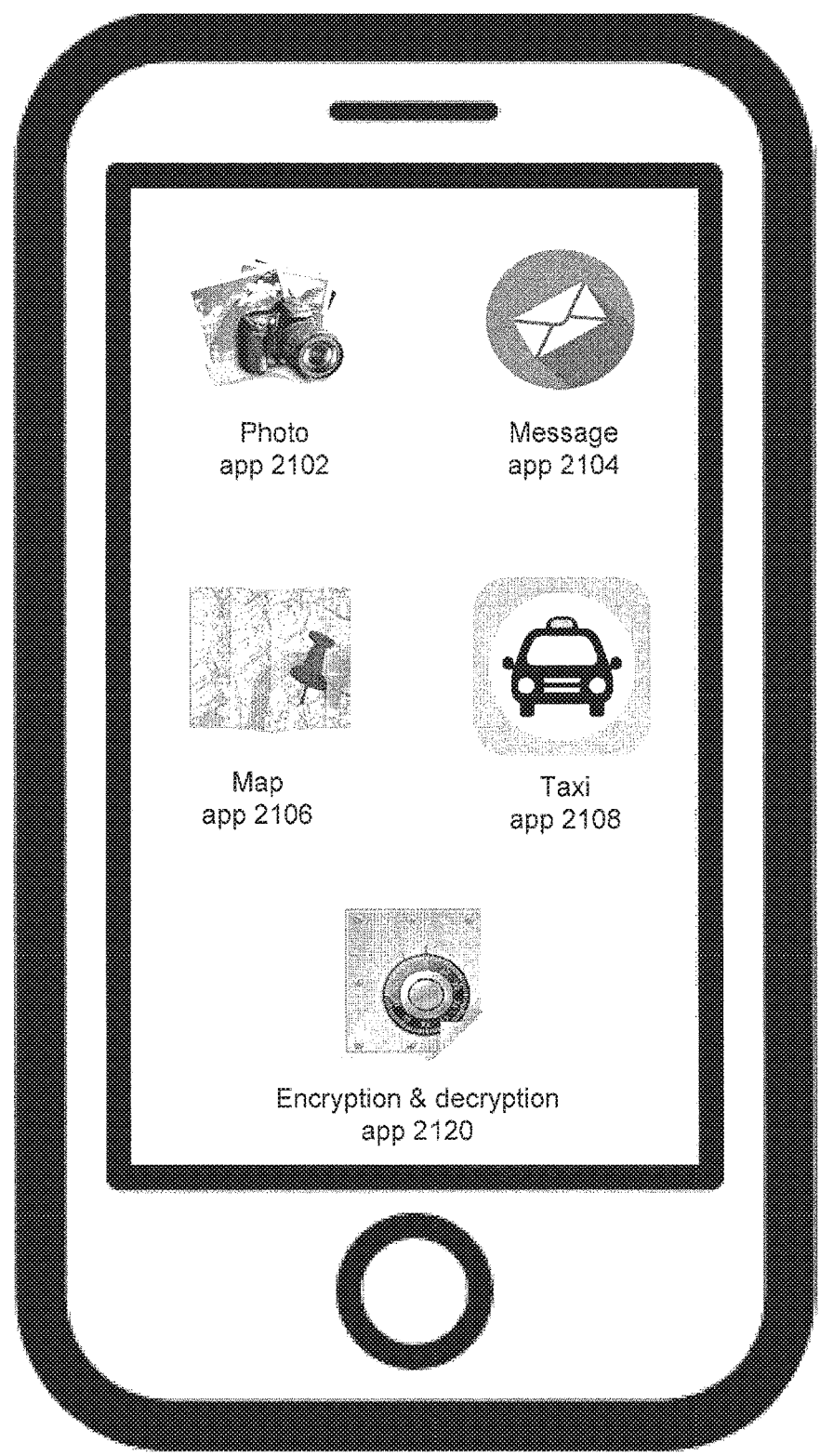
FIG. 21 is a block diagram illustrating an example encryption and decryption application installed on a mobile user device.

FIG. 21 is a block diagram illustrating an example encryption and decryption application installed on a mobile user device 2100. As shown, a mobile user device may have installed multiple application or apps, e.g., a photo app 2102, a messaging app 2104, a map app 2106, a tax app 2108, and an encryption and decryption app 2120. The encryption and decryption app 2120 may implement the functionalities of the software modules of a client host and an encryption server, as described in the present disclosure. The encryption and decryption app 2120 may therefore encrypt data used in other apps, e.g., the photo app 2102, for storage on the mobile user device and decrypt the encrypted data for user access, e.g., by the photo app 2102 or by the messaging app 2104, the map app 2106, or the tax app 2108. In other words, the encryption and decryption app 2120 may provide an interface for the apps installed on the mobile user device to encrypt user data and access the encrypted data within those apps.

Figure 22:
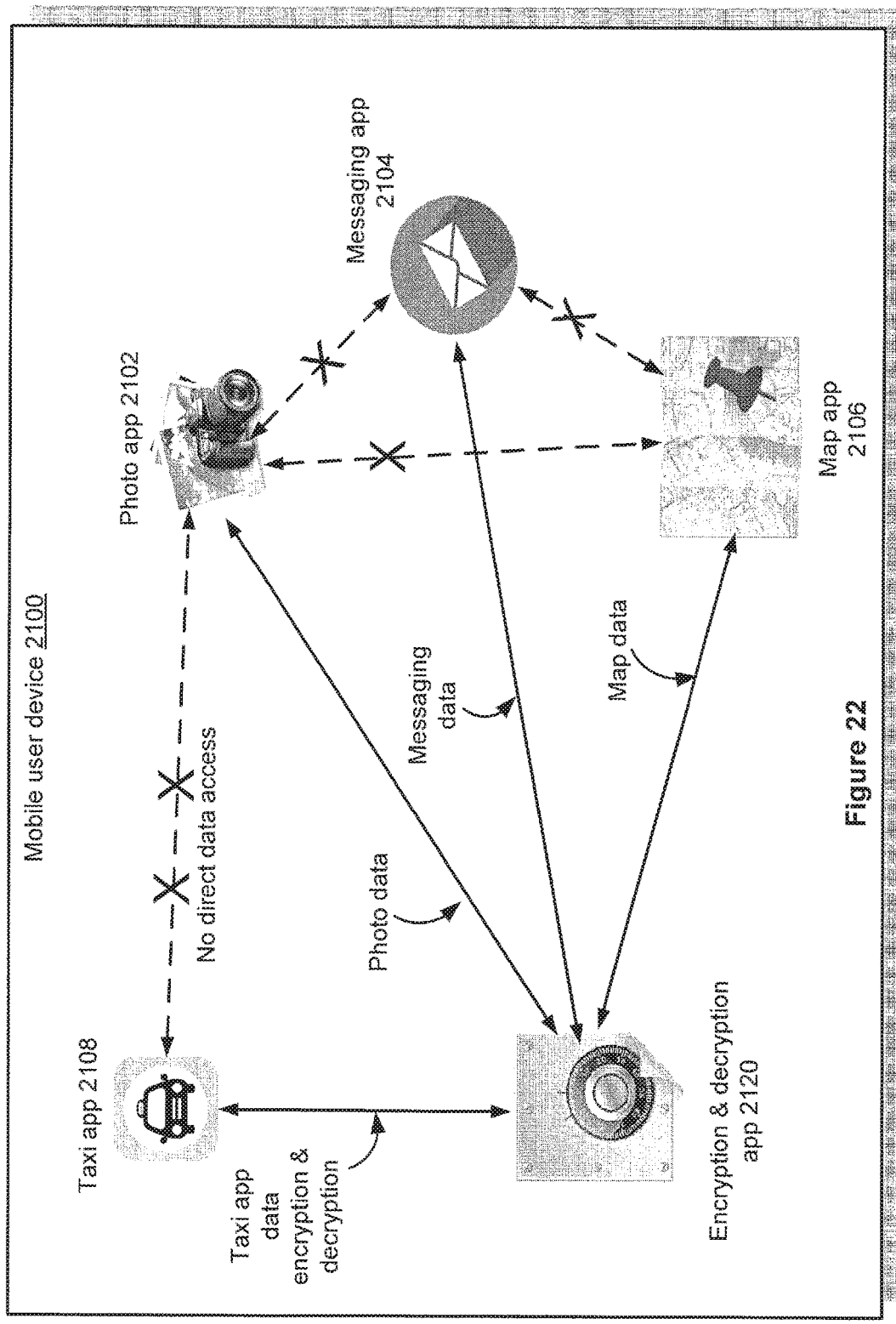
FIG. 22 is a block diagram illustrating example interactions between an encryption and decryption application installed on a mobile user device and other applications installed the mobile user device.

For example, as shown in FIG. 22, when the message app 2104 receives an incoming email, the encryption and decryption app 2120 may encrypt the incoming email for local storage on a cryptographic partition of the mobile use device. When a user requests access to the incoming email, the message app 2104 may request the encryption and decryption app 2120 to decrypt encrypted email and present the decrypted email in a user-readable format. Note that, in some implementations, the encryption and decryption app 2120 prevents the user apps (e.g., the photo app 2102, the messaging app 2104, the map app 2106, the tax app 2108) from directly accessing each other's data. For example, the encryption and decryption app 2120 prevents a user from saving, a photo attachment from the messaging app 2104 into the photo app 2102. Rather, the user may be required to enable, either beforehand or on-the-fly, the encryption and decryption app 2120 to manage and coordinate data access operations among different user apps. For example, a photo attachment from the messaging app 2104 needs to be encrypted by the encryption and decryption app 2120, before the photo attachment can be accessed (after an appropriate decryption) in the photo app 2102.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, without changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A computing server, comprising:
   a non-transitory memory; and
   one or more hardware processors configured to execute instructions to cause the computing server to perform operations comprising:
   determining that the computing server is connected to a second computing device;
   responsive to determining that the computing server is connected to the second computing device,
      accessing a virtual storage area that is displayed to a user of the second computing device as part of storage space on the computing server, wherein the virtual storage area redirects a read or write request directed at the virtual storage to corresponding storage space on the second computing device;
   detecting a first request by the user of the second computer device to read first data displayed to the user as stored in the virtual storage area;

responsive to detecting the first request to read first data displayed to the user as stored in the virtual storage area,
    transmitting the first data, from a storage area on the second computing device, to the computing server;
decrypting, using the computing server, the first data to produce first decrypted data;
transmitting the first decrypted data from the computing server to the second computing device;
providing the first decrypted data for access, on the second computing device, by the first request;
detecting a second request by a user of the second computer device to write second data to the virtual storage area;
responsive to detecting the second request to write the second data to the virtual storage area,
    transmitting the second data from the second computing device to the computing server;
encrypting, using the computing server, the second data to produce second encrypted data;
transmitting the second encrypted data from the computing server to the second computing device; and
storing the second encrypted data on the second computing device.

2. The computing server of claim 1 is a network data encryption and decryption server connected to the second computing device via a LAN.

3. The computing server of claim 1, wherein the operations further comprise enabling communication between the computing server and the second computing device using a wired or a wireless data connection.

4. The computing server of claim 1, wherein the operations further comprise: establishing a LAN connection between the computing server and the second computing device; and transmitting the first data, the first decrypted data, the second data and the second encrypted data between the computing server and the second computing device using the LAN connection.

5. A mobile user device, comprising:
a non-transitory memory; and
one or more hardware processors configured to execute instructions to cause the mobile user device to perform operations comprising:
determining that the mobile user device is connected to a second computing device;
responsive to determining that the mobile user device is connected to the second computing device, accessing a virtual storage area that is displayed to a user of the second computing device as part of storage space on the mobile user device, wherein the virtual storage area redirects a read or write request directed at the virtual storage to corresponding storage space on the second computing device;
detecting a first request by a user of the second computer device to read first data identified to the user as stored in the virtual storage area;
responsive to detecting the first request to read first data displayed to the user as stored in the virtual storage area, transmitting the first data, from a storage area on the second computing device, to the mobile user device;
decrypting, using the mobile user device, the first data to produce first decrypted data;
transmitting the first decrypted data from the mobile user device to the second computing device;
providing the first decrypted data for access, on the second computing device, by the first request;
detecting a second request by a user of the second computer device to write second data to the virtual storage area;
responsive to detecting the second request to write second data to the virtual storage area, transmitting the second data from the second computing device to the mobile user device;
encrypting, using the mobile user device, the second data to produce second encrypted data;
transmitting the second encrypted data from the mobile user device to the second computing device; and
storing the second encrypted data on the second computing device.

6. The mobile user device of claim 5 includes one of: a USB device, a smartphone phone, and a tablet computer; and wherein the second computing device includes one of: a smartphone phone, a desktop computer, and a tablet computer.

7. The mobile user device of claim 5 is powered by a power source other than a second power source powering the second computing device.

8. The mobile user device of claim 5, wherein the operations further comprise: in response to detecting the first request, authenticating a user of the second computing device based on one of: a biometric comparison, a passphrase comparison, a voice comparison, and a fingerprint comparison.

9. The mobile user device of claim 5, wherein the operations further comprise: enabling communication between the mobile user device and the second computing device using a wired or a wireless data connection.

10. The mobile user device of claim 5, wherein the operations further comprise: establishing a wireless data connection between the mobile user device and the second computing device; and transmitting the first data, the first decrypted data, the second data and the second encrypted data between the mobile user device and the second computing device using the wireless data connection.

11. The mobile user device of claim 10, wherein the wireless data connection includes one of: a WIFI connection, a Bluetooth connection, a cellular connection, and a NFC connection.

12. A first device, comprising:
a non-transitory memory; and
one or more hardware processors configured to execute instructions to cause the first device to perform operations comprising:
determining that the first device is connected to a second computing device;
responsive to determining that the first device is connected to the second computing device, accessing a virtual storage area that is identified to a user of the second computing device as part of storage space on the first device, wherein the virtual storage area redirects a read or write request directed at the virtual storage to corresponding storage space on a third computing device that is separate from the first device and from the second computing device;
detecting a first request by a user of the second computer device to read first data identified to the user as stored in the virtual storage area;
responsive to detecting the first request to read first data identified to the user as stored in the virtual storage area, transmitting the first data, from a storage area on the third computing device, to the device;
decrypting, using the first device, the first data to produce first decrypted data;

transmitting the first decrypted data from the first device to the second computing device;

providing the first decrypted data for access, on the second computing device, by the first request;

detecting a second request by a user of the second computer device to write second data to virtual storage area;

responsive to detecting the second request to write the second data to the virtual storage area, transmitting the second data from the second computing device to the first device;

encrypting, using the first device, the second data to produce second encrypted data;

transmitting the second encrypted data from the device to the third computing device; and storing the second encrypted data on the third computing device.

13. The first device of claim 12, wherein the third computing device is a USB drive connected with the first device.

14. The first device of claim 12, wherein the third computing device is a USB drive connected with the second computing device.

15. The first device of claim 12 includes one of: a smartphone phone, a desktop computer, and a tablet computer; and wherein the second computing device includes one of: a smartphone phone, a desktop computer, and a tablet computer.

16. The first device of claim 12 is powered by a power source other than a second power source powering the second computing device.

17. The first device of claim 12, wherein the operations further comprise: in response to detecting the first request, authenticating a user of the second computing device based on one of: a biometric comparison, a passphrase comparison, a voice comparison, and a fingerprint comparison.

18. The first device of claim 12, wherein the operations further comprise: enabling communication between the first device and the second computing device using a wired or wireless data connection.

19. The first device of claim 12, wherein the operations further comprise: establishing a wireless data connection between the first device and the second computing device; and transmitting the first data, the first decrypted data, the second data and the second encrypted data between the first device and the second computing device using the wireless data connection.

20. The first device of claim 19, wherein the wireless data connection includes one of: a WIFI connection, a Bluetooth connection, a cellular connection, and a NFC connection.

* * * * *